United States Patent
van Doorn et al.

(10) Patent No.: US 11,093,125 B1
(45) Date of Patent: Aug. 17, 2021

(54) EMAIL CONVERSATION LINKING

(71) Applicant: Amazon Technologies, Inc., Seattle, WA (US)

(72) Inventors: Ivo van Doorn, The Haque (NL); Floor Mesters, The Haque (NL)

(73) Assignee: Amazon Technologies, Inc., Seattle, WA (US)

(*) Notice: Subject to any disclaimer, the term of this patent is extended or adjusted under 35 U.S.C. 154(b) by 304 days.

(21) Appl. No.: 14/564,524

(22) Filed: Dec. 9, 2014

(51) Int. Cl.
*G06F 3/0484* (2013.01)
*H04L 12/58* (2006.01)

(52) U.S. Cl.
CPC ...... *G06F 3/04847* (2013.01); *G06F 3/04842* (2013.01); *H04L 51/16* (2013.01)

(58) Field of Classification Search
CPC . G06Q 10/10; G06F 3/04847; G06F 3/04842; H04L 51/16
USPC ................... 715/752; 709/203, 227
See application file for complete search history.

(56) References Cited

U.S. PATENT DOCUMENTS

| | | | |
|---|---|---|---|
| 6,630,944 B1 | 10/2003 | Kakuta et al. | |
| 7,328,242 B1* | 2/2008 | McCarthy | G06Q 10/10 709/203 |
| 7,516,186 B1 | 4/2009 | Borghetti et al. | |
| 7,657,935 B2 | 2/2010 | Stolfo et al. | |
| 7,978,828 B1 | 7/2011 | Edamadaka et al. | |
| 9,350,692 B1 | 5/2016 | Van As et al. | |
| 2004/0212639 A1 | 10/2004 | Smoot et al. | |
| 2005/0223057 A1 | 10/2005 | Buchheit et al. | |
| 2005/0234850 A1 | 10/2005 | Buchheit et al. | |
| 2006/0053204 A1 | 3/2006 | Sundararajan et al. | |
| 2006/0085502 A1 | 4/2006 | Sundararajan et al. | |
| 2006/0168315 A1 | 7/2006 | Daniell et al. | |
| 2006/0271630 A1 | 11/2006 | Bensky et al. | |
| 2007/0027954 A1 | 2/2007 | Chen et al. | |
| 2007/0078986 A1* | 4/2007 | Ethier | H04L 65/1069 709/227 |
| 2007/0250583 A1 | 10/2007 | Hardy et al. | |
| 2008/0102863 A1 | 5/2008 | Hardy et al. | |

(Continued)

OTHER PUBLICATIONS

"Gmail Tips: The Complete Collection"; http://www.g04.com;misc/GmailTipsComplete.html; 2004-2007; accessed Feb. 1, 2018; 40 pages.

(Continued)

*Primary Examiner* — Andrey Belousov
(74) *Attorney, Agent, or Firm* — BakerHostetler

(57) ABSTRACT

An email client identifies email conversations from email header information and presents the conversations along with emails in a user's inbox. User inputs are received selecting first and second email conversations and specifying they should be linked. The email client generates an identifier and associates the identifier with emails that are comprised in the selected first and second conversations. Upon receipt of an email that is part of a conversation linked by another user, the recipient's email client provides a button to implement the link. A user may select to create a new email and link the new email to an existing conversation. An identifier is generated and associated with the new email and emails in the selected conversation. A user may convert part of an existing conversation to a new conversation and may start a new email conversation from an existing email conversation.

20 Claims, 31 Drawing Sheets

(56) References Cited

U.S. PATENT DOCUMENTS

| | | |
|---|---|---|
| 2008/0162651 A1 | 7/2008 | Madnani |
| 2008/0294730 A1 | 11/2008 | Oral et al. |
| 2009/0077182 A1 | 3/2009 | Banjara et al. |
| 2009/0150394 A1 | 6/2009 | Bailor et al. |
| 2009/0234924 A1 | 9/2009 | Edelen et al. |
| 2009/0287780 A1 | 11/2009 | Gawor et al. |
| 2009/0327438 A1 | 12/2009 | Cheng et al. |
| 2010/0082759 A1 | 4/2010 | Nalliah et al. |
| 2010/0087169 A1 | 4/2010 | Lin et al. |
| 2010/0217808 A1 | 8/2010 | Benninger |
| 2010/0223279 A1 | 9/2010 | Scott |
| 2011/0225249 A1 | 9/2011 | Forstall et al. |
| 2011/0231499 A1 | 9/2011 | Stovicek et al. |
| 2011/0302250 A1 | 12/2011 | Plotts et al. |
| 2012/0054135 A1 | 3/2012 | Salaka et al. |
| 2012/0079041 A1 | 3/2012 | Vuong |
| 2012/0124142 A1 | 5/2012 | Kroeger et al. |
| 2012/0173633 A1 | 7/2012 | Balabhadrapatruni et al. |
| 2012/0185797 A1 | 7/2012 | Thorsen et al. |
| 2012/0210334 A1 | 8/2012 | Sutedja et al. |
| 2012/0239761 A1 | 9/2012 | Linner et al. |
| 2014/0222924 A1 | 8/2014 | Rasmussen et al. |
| 2015/0106741 A1 | 4/2015 | Friend et al. |
| 2015/0113076 A1 | 4/2015 | Dubie et al. |
| 2015/0180808 A1 | 6/2015 | Moisa |
| 2015/0263995 A1 | 9/2015 | Mahood et al. |
| 2015/0350142 A1 | 12/2015 | Guenther et al. |
| 2016/0135021 A1 | 5/2016 | He |

OTHER PUBLICATIONS

"Outlook 2010: Add or link e-mail message or existing conversation to another conversation"; https://social.mdsn.microsoft.com/Forums/office/en-US/57af17cc-8b3a-4685-bccc-905046e38c41,,,,,; accessed Jun. 20, 2016; 9 pages.

Palme et al.; "Message Threading in E-mail Software"; Technical Report; Dept. of Computer and Systems Sciences; Dec. 1998; 5 pages.

Frank et al.; "Protecting Information on Laptops, PDAs, and Cell Phones"; Strategic Finance; Jan. 2002; p. 24-29.

Seo et al.; "Online Community Search Using Conversational Structures"; Inf. Retrieval; vol. 14; 2011; p. 547-571.

Microsoft; Microsoft Computer Dictionary—Fifth Edition; 2002; p. 494.

\* cited by examiner

EMAIL CONVERSATION LINKING

BACKGROUND

Email has become one of the primary technologies people rely upon to communicate. Organizations of all types and sizes use email to communicate both internally and externally. Individuals have widely adopted email for personal use.

The popularity of email communication is evidenced by the large number of emails that are received in user inboxes. Within some organizations, it is not uncommon for individual users to receive many tens, and in some instances, hundreds of emails in their inbox in a single day. Even with respect to email accounts devoted to personal matters, it is common to receive large quantities of emails in a short duration of time.

With the increased volume of emails has come a greater breadth of topics discussed by way of email. At one time, email was used to address limited business or personal issues. However, email is now used to converse regarding virtually every aspect of users' business and personal lives.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
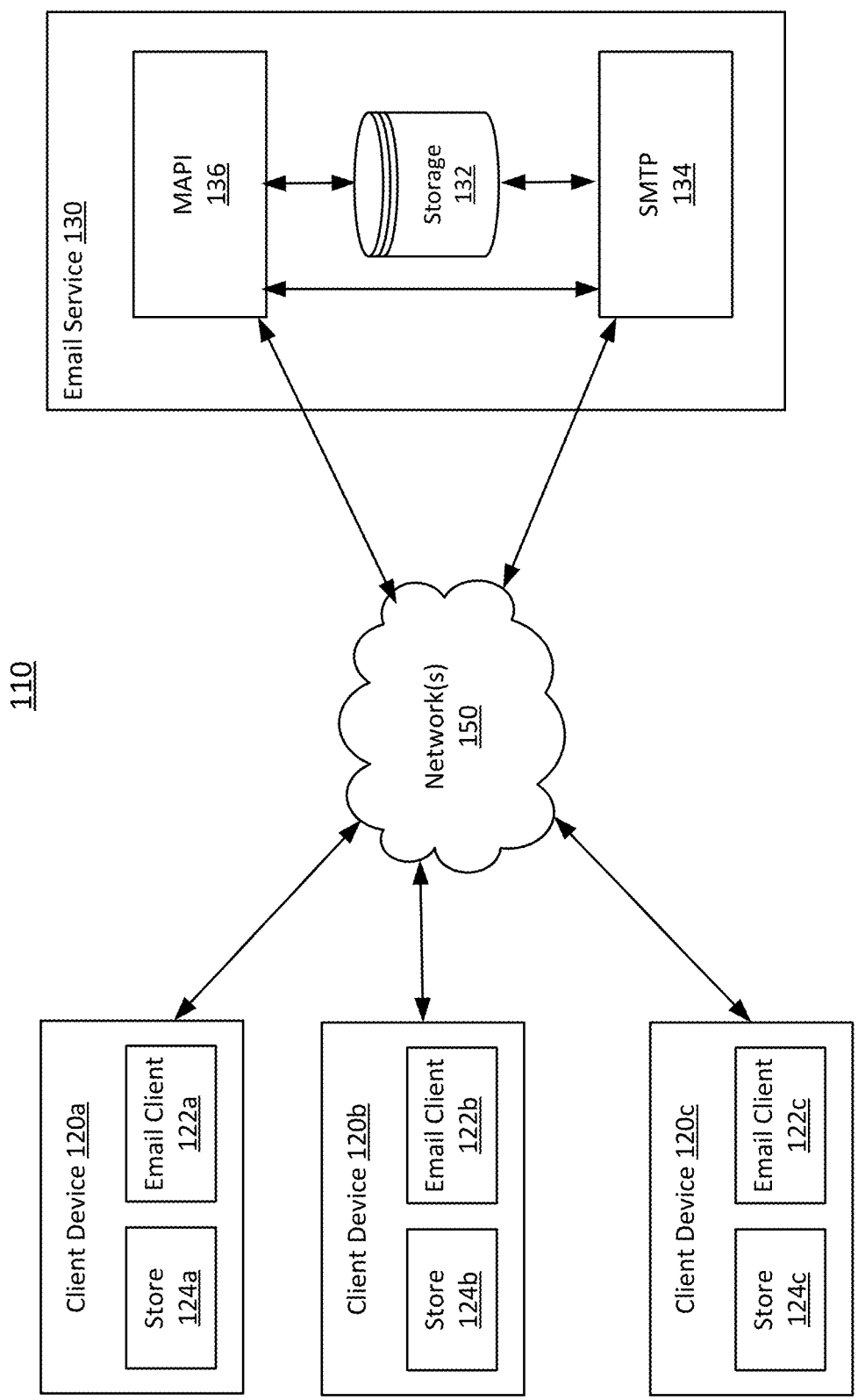
FIG. 1 depicts an example email communication network architecture.

The large number of emails that are received in users' inboxes and the wide variety of topics to which the received emails relate has resulted in the practical need to organize emails. One email feature that helps to address this need is the capability to group emails into email conversations. Some email systems provide for grouping together in a user interface an email and all replies to that email. A group containing an email and the replies to the particular email may be referred to as an email conversation or email thread. Viewing emails and replies to emails in a group, i.e., as an email conversation, allows users to put received emails into context.

While viewing emails in email conversations has proven useful, the functionality offered by existing systems relating to email conversations is limited. Typically, the user may decide only whether or not to view emails in their inbox grouped by email conversation. Otherwise, the user has no control over the emails that are grouped together. Unless an email is a reply to another email, it will not be recorded by the system as being part of the email conversation. Email systems lack functionality whereby users may define which emails may be related to other emails.

Disclosed herein are systems and methods for user controlled linking of email conversations with other emails. The disclosed systems and methods allow individual users to control how email conversations and emails are associated for purposes of presenting emails in their individual mailboxes.

According to an aspect of the disclosed embodiments, email conversations may be linked and presented together in an email inbox. In an example embodiment, an email client identifies email conversations from email header information and presents the email conversations in a listing along with other emails in a user's inbox. The user interface is adapted to receive user inputs selecting first and second email conversations and specifying that the two should be linked. In response to receiving these inputs, the email client generates an identifier and associates the identifier with emails that are comprised in the selected first and second email conversations. The email client subsequently uses the generated identifier and the associations with emails to identify linked email conversations and to display the linked conversations in proximity to each other in a listing of emails.

The email client identifies email conversations and the emails comprised in the conversations by processing References fields in email header information. The References field comprises message identifiers for all prior emails in an email conversation. The email client uses the message identifiers from the References field to group together emails that are identified in the header information as belonging to the same email conversation.

The email client may generate an identifier corresponding to two linked email conversations by combining message identifiers of emails in the linked conversations. In an example scenario, the email client may combine a message identifier of the original or first email in the first email conversation with a message identifier of the original or first email in the second email conversation. In an example embodiment, the generated identifier, which may be referred to as a Group-ID, may be stored in the header information of each email in each of the linked email conversations. In both embodiments, the email client may also store the Group-ID in a link list maintained for the particular user or mailbox. The link list includes group identifiers for links between email conversations that the particular user has herself linked (as opposed to conversations that have linked by others). When the email client subsequently generates a user interface, the email client identifies email conversations that have been linked by the particular user using the Group-ID's stored in the link list.

According to another aspect of the disclosed embodiments, a first email conversation that has been linked to a second email conversation by a first user may be subsequently linked by a recipient of an email in the first email conversation. In an example embodiment, an email client, while processing emails for display in a user's inbox, identifies email conversations from email header information and presents the email conversations in a listing along with other emails. The email client uses group identifier information in the email header information to determine whether or not the email conversations were previously grouped or linked. For the emails conversations that have group identifiers, the email client uses the recipient's link list of identifiers corresponding to links implemented by the recipient to determine whether the links corresponding to the particular identifier have been implemented by the recipient. When an email that is part of an email conversation that was previously linked by another user but not by the recipient is selected for review, the email client identifies the prior linking in the user interface and provides a selectable button with which the email recipient may request that the email conversations be linked as well for purposes of the recipient's inbox. In response to receiving input indicating the email user has selected to link the email conversations, the email client stores the group identifier that was retrieved from the email header information in the particular email recipient's link list of identifiers corresponding to links that have been implemented by the particular user.

According to another aspect of the disclosed embodiments, a new email, one that is not sent in reply to a received email, may be linked to an existing email conversation. In an example embodiment, an email client identifies email conversations from email header information and presents the email conversations in a listing along with other emails in a user's inbox. The user interface is adapted to receive user inputs selecting one of the listed email conversations and selecting to create an email that will be linked to the selected email conversation. The email client retrieves and makes available to the author of the email information from the email header information of emails in the first conversation. When the user requests to send the new email, the email client generates a group identifier corresponding to the link between the new email and the selected conversation. In an example embodiment, the generated group identifier may comprise a unique message identifier corresponding to the new email and a message identifier of the original email in the selected email conversation. The generated identifier is stored in the email header information of the new email as well as in the header information of the emails comprised in the selected email conversation. The group identifier is likewise stored in the link list maintained for the particular user of identifiers corresponding to links implemented by the particular user. The email client subsequently uses the generated identifier and the associations with emails to identify linked email conversations and to display the linked conversations in proximity to each other in a listing of emails.

According to another aspect of the disclosed embodiments, an email conversation may be created from an existing email in an existing email conversation. In an example embodiment, an email client identifies email conversations from email header information and presents the email conversations in a listing along with other emails in a user's inbox. The user interface is adapted to receive user inputs selecting an email in a listed email conversation and selecting to start a new conversation using the selected email. The email client generates a group identifier corresponding to a link between a new conversation comprising the selected email and the conversation in which the email was selected. In an example embodiment, the generated group identifier may comprise a unique message identifier corresponding to the selected email and a message identifier of the original email in the selected email conversation. The generated identifier is stored in the email header information of the selected email of the new email conversation as well as in the header information of the emails comprised in the selected email conversation. The group identifier is likewise stored in the link list maintained for the particular user of identifiers corresponding to links implemented by the particular user. The email client subsequently uses the generated identifier and the association with the selected email in the new conversation and the emails in the selected existing email conversation to generate and display information identifying a new conversation comprising the selected email and the selected existing email conversation.

According to another aspect of the disclosed embodiments, a new email conversation, one that is not created from an email in an existing email conversation, may be created and associated with an existing email conversation. In an example embodiment, an email client identifies email conversations from email header information and presents the email conversations in a listing along with other emails in a user's inbox. The user interface is adapted to receive user inputs selecting one of the listed email conversations and selecting to create a new email in a new email conversation that will be associated with the selected email conversation. The email client retrieves and makes available to the author of the email information from the email header information of emails in the selected conversation. When the user requests to send the new email, the email client generates a group reference identifier corresponding to an association between the new email conversation and the selected email conversation. In an example embodiment, the generated group reference identifier may comprise a unique message identifier corresponding to the new email in the new email conversation and a message identifier of the original email in the selected email conversation. The generated group reference identifier is stored in the email header information of the new email in the new email conversation as well as in the header information of the emails comprised in the selected email conversation. The group reference identifier is likewise stored in a reference list maintained for the particular user of identifiers corresponding to associations between email conversations implemented by the particular user. The email client subsequently uses the generated group reference identifier to identify related email conversations and to create and display information indicating emails in the conversations are associated with other conversations.

Example Email System

FIG. 1 is a diagram illustrating an example email system 110 suitable for linking of email conversations. System 110 comprises email service 130 which provides functionality for sending and receiving emails. Users employ client systems 120a-c to interface with email service 130 via communications network 150. Using client systems 120a-c, users are able to perform operations traditionally associated with email systems such as, for example, creating and sending emails. In addition, and as disclosed herein, using client systems 120a-c, users are also able to link email conversations, link received emails to email conversations, and create links between new emails and existing email conversations.

Email service 130 comprises storage functionality 132 adapted to store and retrieve data including, for example, emails and data relating to those emails. As emails are received at service 130, and as emails are created and sent, those emails may be stored in storage 132. In an example embodiment, the emails are organized into mailboxes, with each mailbox associated with an email user. The mailboxes may be stored in any suitable manner by storage functionality 132. In an example embodiment, user mailboxes and emails comprised therein may be stored in one or more files, which may be, for example, text files. According to another embodiment, user mailboxes and emails may be stored in random access memory. Storage 132 may be implemented using any suitable technology including, for example, computing memory and relational database software.

Simple Mail Transfer Protocol (SMTP) server 134 is adapted to send or transmit emails from service 130 and to receive emails into service 130 from other email systems via network 150. SMTP server 134 interfaces with storage server 132 via any suitable networking technology to store and retrieve email data. It will be appreciated that while in the example embodiment of FIG. 1 the simple mail transfer protocol (SMTP) is depicted as providing an email interface with external email systems, other protocols might also be employed to interface with external email systems.

Messaging Application Programming Interface (MAPI) 136 provides interface functionality between client user devices 120a-c and email service 130. MAPI functionality 136 allows user devices 120a-c to retrieve emails from service 130 and to communicate new emails authored at user devices 120a-c to service 130 for communication to others. In an example scenario, MAPI 136 may receive requests from client devices 120a-c, and more particularly from email clients 122a-c, to retrieve emails for particular users. In response, MAPI may interface with storage 132 to retrieve responsive email data, including email header, bodies, and attachments, and communicate the retrieved data via network 150 to the requesting client. In another scenario, MAPI 136 may receive requests from email clients 122a-c to send emails, in response to which MAPI 136 interfaces with storage 132 and SMTP server 134 to have requested emails transmitted. MAPI 136 interfaces with storage server 132 and SMTP server 134 via any suitable networking technology to store and retrieve email data. It will be appreciated that while in the example embodiment depicted in FIG. 1 the MAPI protocol is depicted as providing interface functionality with devices 120a-c, other protocols such as IMAP and/or POP may alternatively or additionally be employed.

Client systems 120a-c may be any that are suitable to access email service 130 in order to review email inboxes and to prepare and send emails. By way of example, client systems 120a-c may be desktop computers, laptop computers, tablet computers, wireless phones, personal digital assistants, media players, etc. While only three devices are illustrated in FIG. 1, it is understood that service 130 may be accessed by any number of computing devices.

In the example embodiment depicted in FIG. 1, each of client systems 120a-c comprise email client 122. Email clients 122a-c are adapted to perform user-directed functionality of the emailing process. For example, email clients 122a-c are adapted to retrieve emails from email service 130, to display emails, to provide a user interface for organizing and preparing emails, and to transmit prepared emails to email service 130. As described herein, email clients 122a-c can also be adapted to allow groups of emails or email conversations to be linked to each other, to link received emails to email conversations, and to create links between new emails and existing email conversations. Email clients 122a-c interface with data store 124a-c to store and retrieve email data including email header information. Email clients may also store in data store 124a-c information identifying links that the user of the particular device has created between email conversations and between emails and email conversations.

Although the functionality provided by the email clients 122a-c may be the same or similar as between client devices 120a-c, the email clients 122 may vary between devices. For example, the email clients 122a-c may be different so as to accommodate the different computing architectures of individual clients 120a-c. In an illustrative scenario, email client 122a may be running a Windows operating system, email client 122b may be running on an Apple operating system, and email client 120c may be running on an Android operating system. In another scenario, email client 122 may be a Web client generated via communications with email service 130. Although the exact implementation of email client functionality may vary as between clients, the basic client email functionalities such as receiving emails, sending emails, and reviewing received emails are provided. As described herein, email clients 122a-c further support linking of email conversations. MAPI 136 is adapted to interface with the various different hardware and software combinations comprised in email clients 122.

Email service 130 is accessible to client devices 120a-c and external email services via communications network 150. Communications network 150 may be any type of network that is suitable for providing communications between client computing devices 120a-c and service 130. Moreover, communications network 150 may comprise a combination of discrete networks which may use different technologies. For example, communications network 150 may comprise local area networks (LANs), wide area networks (WAN's), cellular networks, or combinations thereof. Communications network 150 may comprise wireless, wireline, or combinations thereof. In an exemplary embodiment, communications network 150 comprises the Internet and may additionally comprise any networks adapted to communicate with the Internet.

Email system 110 may employ a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computing device, such as one of devices 120a-c that accesses shared network resources such as email service 130 that is provided by other computers (i.e., servers). A server is typically a remote computer system accessible over a remote network such as the Internet. The client process may be active in a first computer system, and the server process may be active in a second computer system, communicating with one another over a communications medium and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

Email Header Information

An email comprises an email body, header information that describes processing the particular email has undergone, and any attachments to the email. Users of email are typically focused on the text of the email messages, i.e., the bodies of the email, which they send and receive. While the significance of email header data is frequently overlooked, email users may be accustomed to reviewing part of this header information when reviewing received emails. For example, email clients will typically display information identifying from whom a particular email was received, to whom the email was sent, a subject of the email, and a date and time the email was sent. This information and more may be comprised in the header information of an email.

An excerpt of an example email header is shown below. An email may comprise email header information comprising, for example: a "From" field which identifies an email address from which the email was received; a "Date" field which identifies the date the email was received; a "To" field which identifies the email addresses to which the email was addressed; a "CC" field which identifies email addresses that were copied on the email; and a "Subject" field which identifies a subject matter description provided by the sender of the email. Email clients will often presents such header information along with the email body.

From: <john.doe@example.com>
Date: <Mon, 6 Oct. 2014 13:15:00>
To: <jane.doe@example.com>
CC: <adam.smith@example.com>
Subject: Example email header information Email headers further comprise information uniquely identifying the particular email as well as information identifying any emails in a conversation or thread to which the particular email relates. An additional excerpt of an example email header is shown below. An email's header information will typically comprise a message identifier, denoted as Message-ID field, which contains a unique identifier associated with the particular email. The Message-ID is typically a combination of a domain, e.g., example.com, and a series of alpha-numeric characters. In the example illustrated below, the Message-ID has the value 20140603456586.9876@example.com.

As is further illustrated in the example message header information listed below, an email header may also comprise a References field. The References field, denoted in the header information as "References," contains a series of message identifiers for the additional emails that are part of the same conversation or thread as the particular email. The References field lists the message identifiers for each of the messages in the conversation/thread. The last listed message identifier corresponds to the email that is the parent of the particular email whose header it is. In the example listed below, the Message-ID of the parent email is 20140502984343.6745@example.org. Listed just prior to the Message-ID for the parent email is the message identifier for the grandparent. In the example listed illustrated below, the Message-ID of the grandparent is 20140506110359.54351@example.com. The pattern of listing the message identifier of the immediate parent to the left of the child continues and concludes with the message identifier of the original email from which all subsequent emails are children. In the example listed below, the Message-ID of the original or first email in an email conversation is 20140405080305.15345@example.com.

Message-ID: <20140603456586.9876@example.com>
References: <20140405080305.15345@example.com>
<20140506110359.54351@example.com>
<20140502984343.6745@example.org>

Generally, when an email user replies to an email, a new Message-ID is created for the new email, and the Message-ID of the email to which the user is responding is added to the References field for the new email. In other words, when a reply is made to an email, the email that is being replied to is recognized as the parent of the new email and the corresponding Message-ID is added to the message identifiers listed in the References field.

Linking Email Conversations

According to an aspect of the disclosed embodiments, existing email conversations may be linked and presented together in an email inbox. An email conversation, which may be referred to by any number of other names including, for example, an email thread, refers to two or more emails that are identified in email header information as related. The most common circumstance whereby two or more emails may be related is where an email is sent in reply to an earlier email. The original email and the reply email form an email conversation or thread. The relationship between emails is typically recorded in the email header information in the "References" field as described above.

Figure 2:
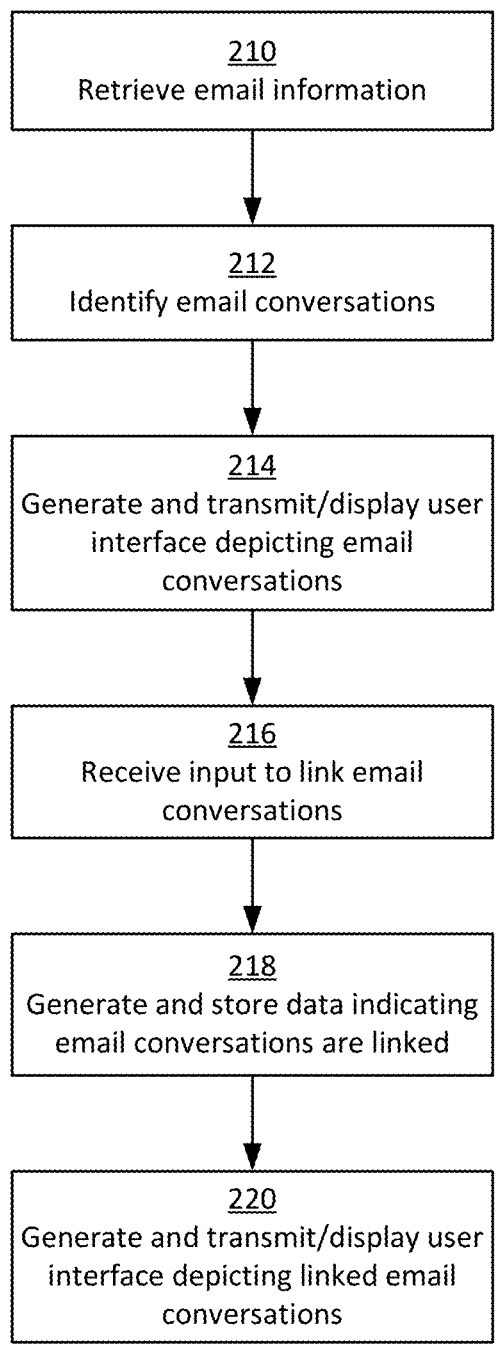
FIG. 2 depicts a flow diagram of an example process for linking email conversations.

Applicants disclose herein systems and methods whereby email conversations may be designated as being related to each other. In other words, the email conversations may be linked to each other. FIG. 2 is a diagram depicting example processing that may be performed by email client 122 in establishing a link between email conversations. As shown, at block 210, an email client 122 executing on any of client devices 120a-c retrieves email information, including email header information, from email service 130. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 212, email client 122 processes the received email data to identify messages that have been grouped together as corresponding to an email conversation. In an example scenario, email client 122 parses email header information to identify emails that form part of conversations. More particularly, email client 122 processes the References field information in the received email information to identify emails that form part of email conversations. This may involve parsing the References field to identify the Message-ID's for all emails listed as belonging to an email conversation and retrieving the corresponding email data for the identified Message-ID's.

At block 214, email client 122 generates and transmits for display user interface data depicting emails. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Figure 3A:
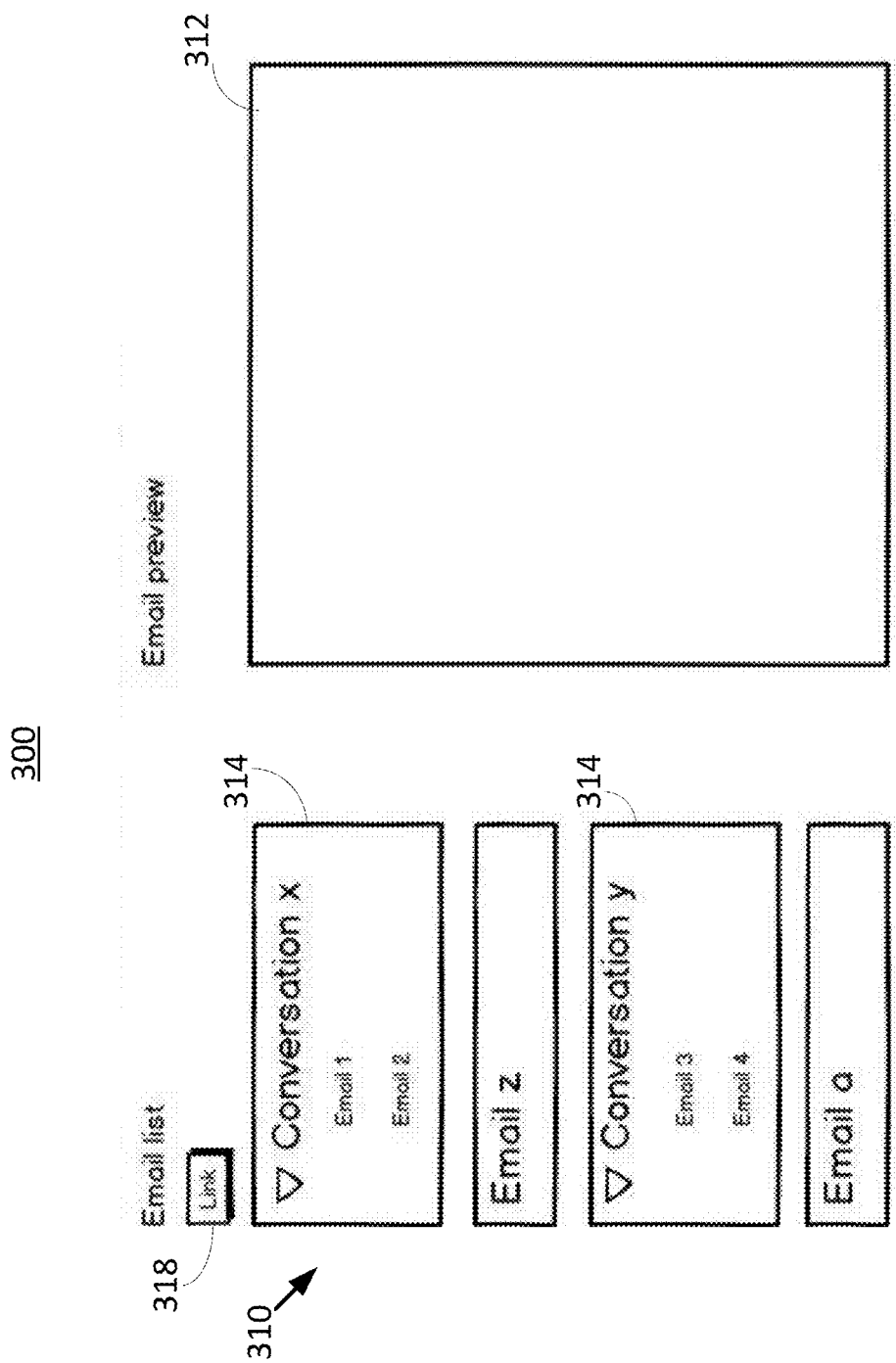
FIGS. 3a-e depict example graphical user interfaces for use in linking email conversations.

FIG. 3a depicts an example user interface 300 that may be generated by email client 122 at block 214. As shown, the user interface data generated and displayed by email client 122 may comprise email listing pane 310 and email preview pane 312. Email listing pane 310 displays a listing of emails that email client 122 identified in the email data retrieved from service 130. As shown, email client 122 displays emails that are related to each other, i.e., are comprised in the same email conversation, in groups 314. The emails comprised in an email conversation or group 314 are displayed in proximity to each other. In an example scenario, the email conversations may be designated and differentiated from other emails by additional user interface features such as separate window panes, icons, headings, and indenting. Email preview pane 312 displays the text of emails as the emails are selected in email listing 310.

Figure 3B:
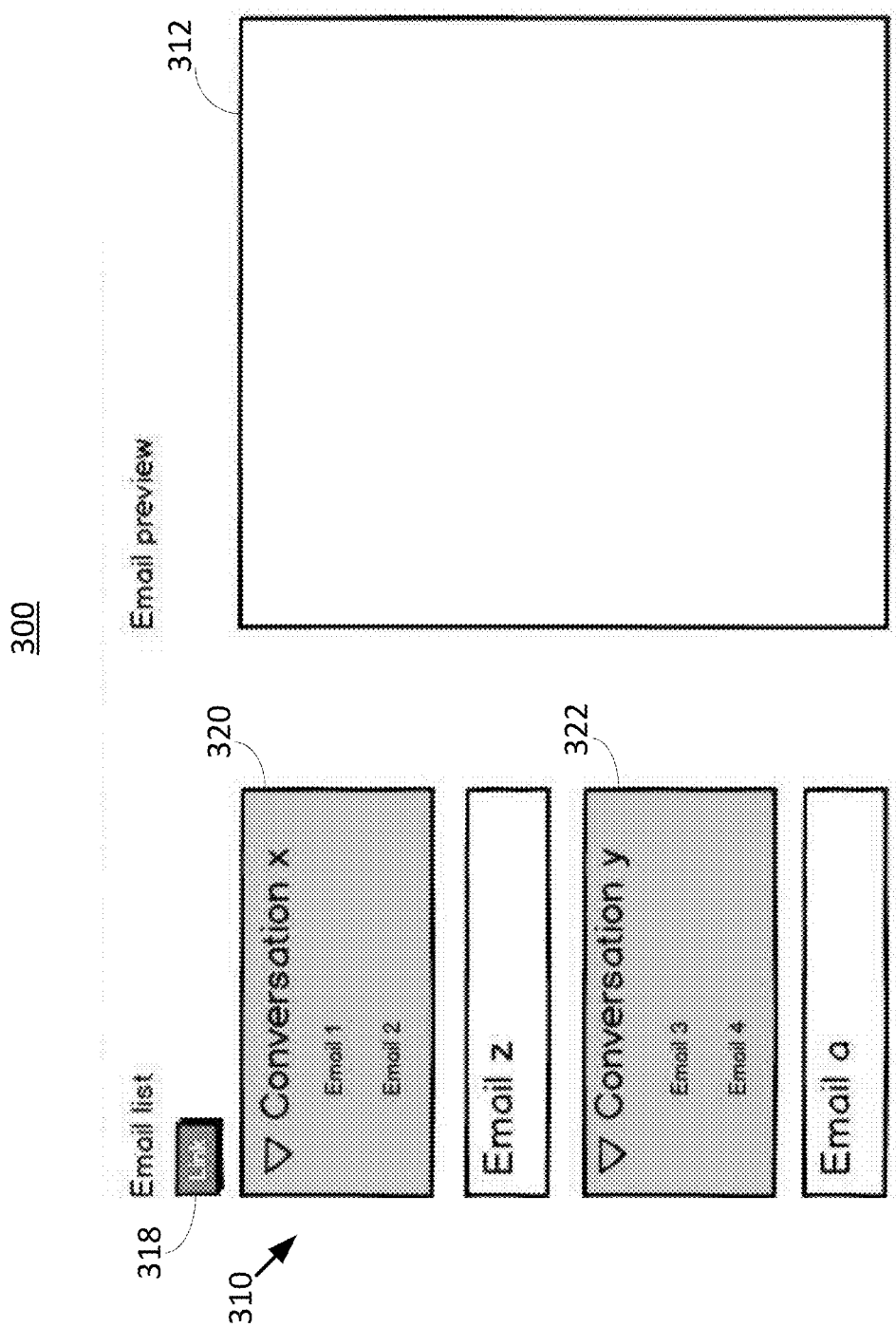

The generated user interface 300 may operate in any of numerous different manners in order to allow users to link email conversations. FIG. 3b illustrates the operation of a first example embodiment. In an example scenario, user interface 300 may be adapted to receive inputs selecting a first group of emails 320, i.e., a first email conversation, and a second group of emails 322, i.e., a second email conversation, in email listing pane 310. A user may indicate the two selected groups of emails should be linked by depressing "Link" button 318. Data reflecting the selected conversations 320 and 322 and the depressed "Link" button 318 are received and used by email client 122 in further processing to implement the link as described below.

Figure 3C:
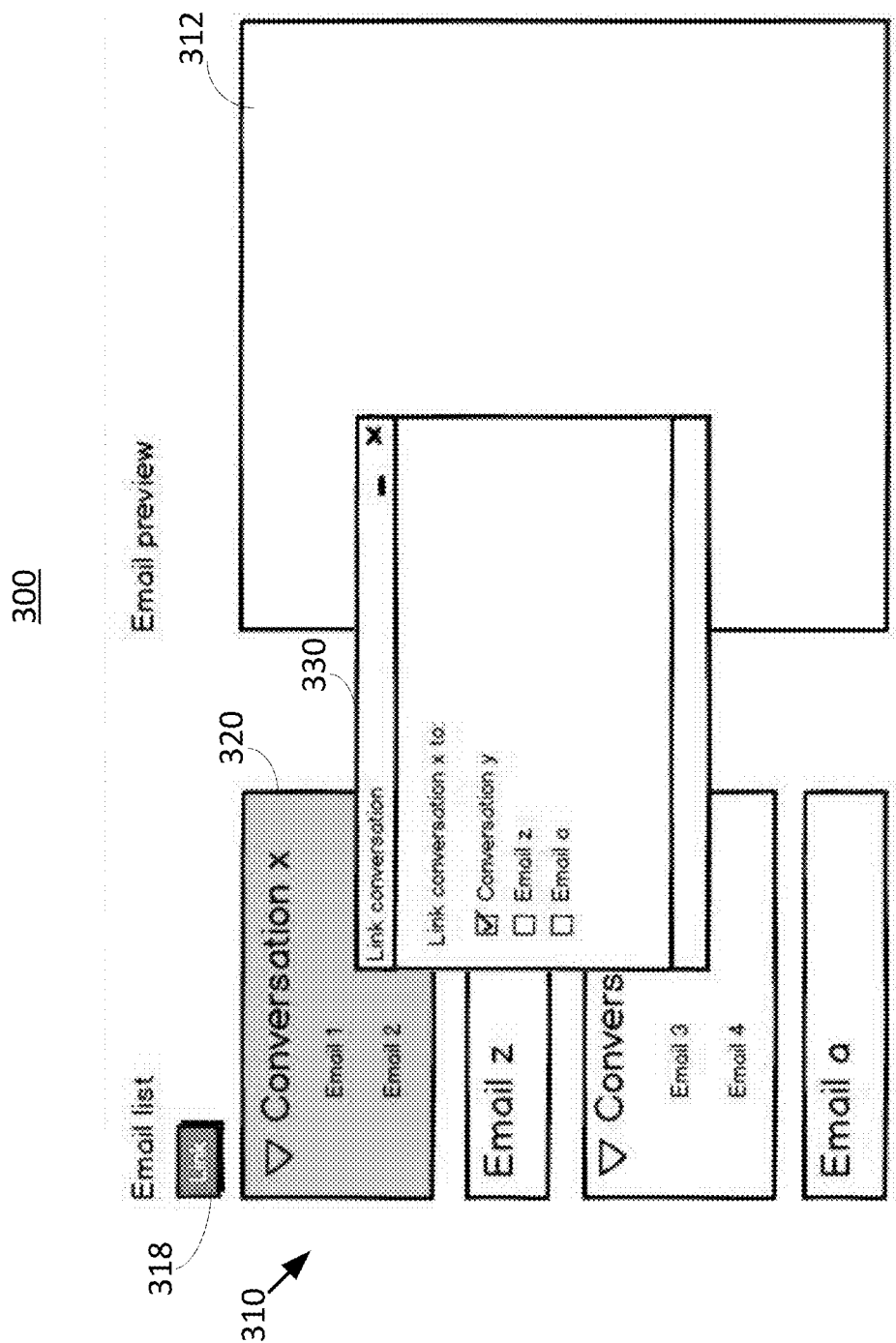

FIG. 3c illustrates a second method of processing that may be performed by example user interface 300. As noted above, user interface 300 is adapted to receive user inputs selecting a first group of emails 320. In this particular embodiment, user input depressing the "Link" button 318 causes email client 122 to generate a second screen area or pop up dialog box 330 with which the user may select a second conversation or email. As shown, pop up dialog box 330 contains a menu of email conversations and emails which may be selected for linking with the first selected email conversation 320. Upon the user selecting one of the menu items, data reflecting the selected conversation 320 and the conversation or email selected in popup 330 are received and used by email client 122 in further processing to implement the link as described below.

Figure 3D:
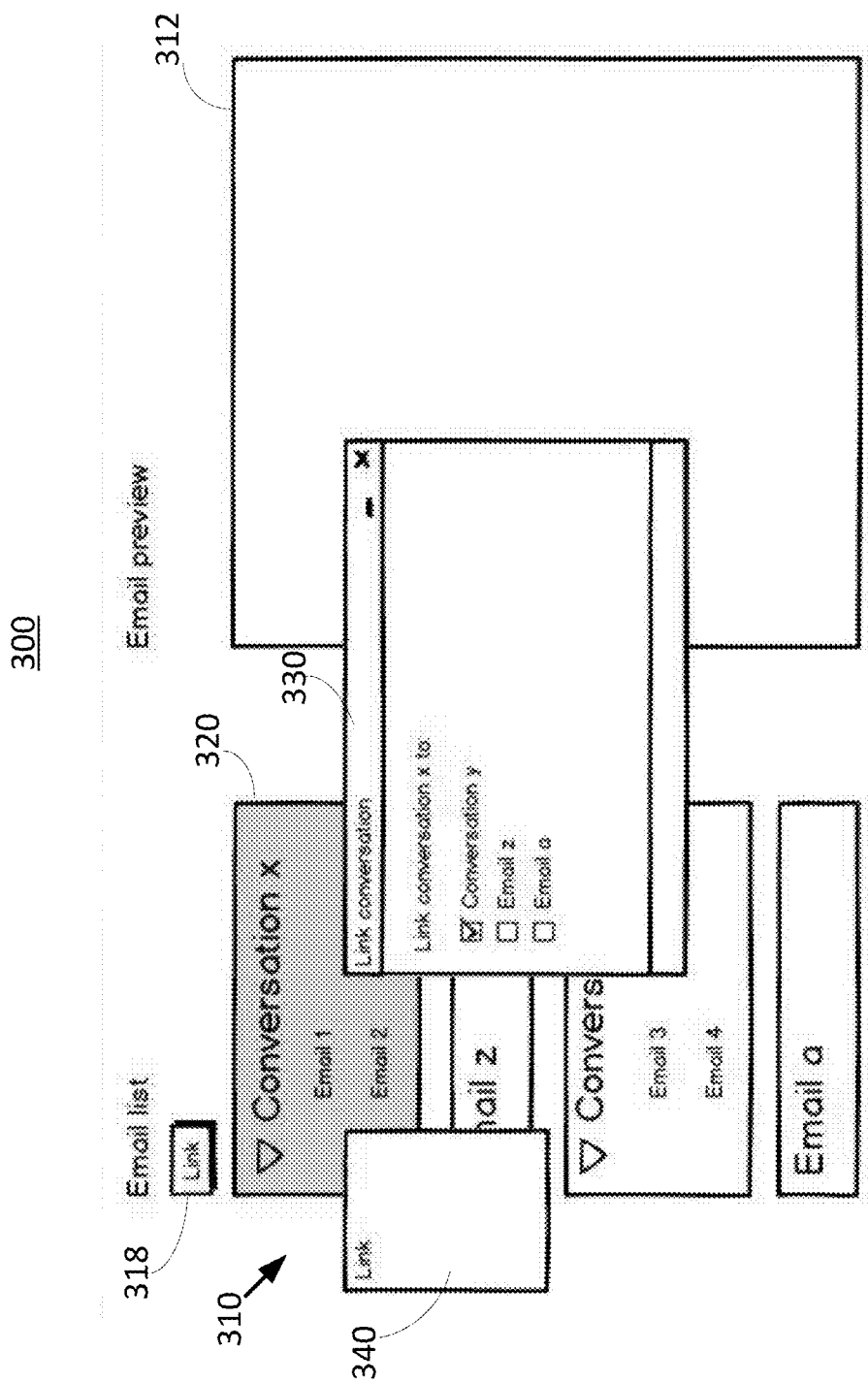

Yet another alternative mode of operation of a user interface is depicted in connection with FIG. 3d. User interface 300 is adapted to receive user input selecting a first email conversation or group of emails 320. In the embodiment of FIG. 3d, the user interface accepts a right mouse click on the selected email conversation which causes email client 122 to display a second window area or popup dialog box 340 on which a menu item for selecting to create a link may be displayed and selected. Depressing the link menu item on popup 340 causes email client 122 to generate a third screen area or pop up dialog box 330 with which the user may select a second conversation or email. As shown, pop up dialog box 330 contains a menu of email conversations and emails which may be selected for linking with the first selected email conversation 320. Upon the user selecting one of the menu items, data reflecting the selected conversation 320 and the conversation or email selected in popup 330 are received and used by email client 122 in further processing to implement the link as described below.

Referring back to FIG. 2, at block 216, email client 122 receives the inputs originating in the graphical user interface 300. The received information may comprise, for example, an identification of the selected email conversations and an indication the operator has selected to link the selected email conversations. In another scenario, the received information may comprise, for example, an identification of a selected email conversation, an identification of a selected email, and an indication the operator has selected to link the selected email conversation and email.

At block 218, email client 122 generates and stores data representing or indicating a link between the selected first email conversation and, depending upon the user selection, either a selected second email conversation or a selected email. In an example embodiment, email client 122 generates an identifier corresponding to the requested link between the first email conversation and the second email conversation or email. The identifier is stored in relation to (e.g., is associated with) the first email conversation and the second email conversation or email.

The identifier may have any form suitable for identifying that an email conversation or group of emails is linked to another email or group of emails. In an example embodiment, the generated identifier is derived from or comprises email header information identifying the first email conversation and email header information identifying either a selected second email conversation or selected email. In an example scenario wherein the received information indicates to link a first email conversation and a second email conversation, the identifier that is created may comprise a combination of a Message-ID from the References field of the first email conversation and a Message-ID from the References field of the second email conversation. The listing below provides example header references information associated with an example first email conversation and an example second email conversation.

First Email Conversation
Message-ID: <20140603456586.11111@example.com>
References: <11111111111111.11111@example.com>
   <20140506110359.54351@example.com>
   <20140502984343.67455@example.org>
Second Email Conversation
Message-ID: <20140603456586.22222@example.com>
References: <22222222222222.22222@example.com>
   <20140506110359.54351@example.com>
   <20140502984343.6745@example.org>

As shown in the example header information listing, the first email, identified with Message-ID 20140603456586.11111@example.com comprises a References field which, based upon the order of the listed Message-ID's, identifies Message-ID 11111111111111.11111@example.com as the originating or first email for the particular email conversation. The second email identified with Message-ID 20140603456586.22222@example.com comprises a References field which, based upon the order of the listed Message-ID's, identifies Message-ID 22222222222222.22222@example.com as the originating or first email for the second email conversation. In such a scenario, email client 122 parses the References field data for the first email conversation and the second email conversation to identify the message identifiers for the emails that originated each of the email conversation. Email client 122 generates an identifier, which may be referred to as the linking identifier or group identifier, referred to as Group-ID, by incorporating the identified message ID's from both the first email conversation and the second email conversation. In the example scenario wherein the first email conversation and the second email conversation are as listed above, email client 122 may identify the Group-ID as a combination of the Message-IDs of the originating emails for selected email conversations as follows:

Group-ID: <11111111111111.11111@example.com>
<22222222222222.22222@example.com>

In the scenario wherein the inputs received at block 216 identify a first email conversation is to be linked with an email, at block 218, email client 122 generates an identifier by combining a message identifier of the originating email of the first conversation with the message identifier of the email to which the first conversation is to be linked. In the example wherein the Message-ID of the originating message in the first email conversation is 11111111111111.11111@example.com, and the Message-ID of the email to which the conversation is to be linked is 33333333333333.33333@example.com, email client 122 may identify the Group-ID as follows:

Group-ID: <11111111111111.11111@example.com>
<33333333333333.33333@example.com>

After generating a group identifier, email client 122 stores the identifier in relation to the linked items. The group identifier may be stored in any manner that is suitable so as to allow email client 122 to identify that two email conversations or an email conversation and an email are linked. In an example embodiment, email client 122 stores the generated group identifier in the header information of the emails that are associated with those that have been linked. For example, in an example scenario wherein the Group-ID was formed from Message-ID's parsed from the References fields of two different conversations, email client 122 adds the generated Group-ID to the header information for each of the emails that is included in the two email conversations. In an example scenario wherein the Group-ID was formed from a Message-ID parsed from a References field of a first conversation and a Message-ID from an email that is being linked to the first email conversation, email client 122 adds the Group-ID to each of the header information of each of the emails in the first conversation and the header information of the email that is being linked. Email client 122 may store the information wherever the email header information resides including on the client device 120 and/or on service 130. It will be appreciated that the group identifier information stored in the header travels with the email. Accordingly, when the email including its header information is received at another user's inbox, the group identifier will be available for processing by the email client of the recipient.

In another embodiment, email client 122 may store the generated group identifier external to the email header information. For example, email client 122 may store the generated group identifier in a database along with information identifying that the group identifier corresponds to each of the emails that are comprised in the particular email conversations. In an example scenario wherein the Group-ID was formed from Message-ID's parsed from the References fields of two different conversations, email client 122 stores the generated Group-ID in a database along with information identifying the Group-ID corresponds to each of the emails that is included in the two email conversations. In an example scenario wherein the Group-ID was formed from a Message-ID parsed from a References field of a first conversation and a Message-ID from an email that is being linked to the first email conversation, email client 122 stores the generated Group-ID in a database along with information identifying the Group-ID corresponds to each of the emails in the first email conversation and the email that is being linked to the first email conversation. Email client 122 may store the information wherever the email header information resides including on the client device 120 and/or on service 130.

Email client 122 may maintain a list of the links that the particular user/owner/operator has herself created. Such a list may be referred to as, for example, a link list. In an example embodiment, email client 122 may maintain in a link list a listing of the group identifiers corresponding to links or associations that the user/owner/operator has implemented. Email client 122 may subsequently use the information in the list to distinguish linked email conversations that the particular user/owner/owner has herself created from those that other users have created. For example, when email client 122 is parsing email header information and determines that emails in an email conversation have a group identifier associated therewith, email client 122 may refer to the link list for the email conversations the user herself has created in order to determine whether or not the particular email conversation should be depicted in a user interface as having been linked. If the email conversations were linked by the user as designated by an entry of the group identifier in the in the user's list, the email conversations are displayed as linked. Email client 122 may determine that a group identifier associated with an email does not appear in the list of group identifiers associated with links the user herself has created. In this instance, email client 122 may depict the email conversations as not linked, but may also provide user interface features to indicate to the operator that another user has linked the conversations as described below in connection with FIG. 5a. The list of group identifiers corresponding to email conversation links the user herself has created may be stored in any manner and in any location suitable to be operable. In an example embodiment, the list may be stored in a database that is maintained locally on client device 120 and/or on storage 132 in email service 130. The database may comprise the group identifiers, i.e., Group-IDs, corresponding to links that the particular user has implemented stored in relation to an identifier corresponding to the particular user.

At block 220, email client 122 processes the stored data including the generated Group-ID data to generate and transmit user interface data for displaying the linked email conversations. In response to identifying group identifiers in email header information, email client 122 compares the identified group identifiers to identifiers in the list of email conversation links the user herself has created. In the scenario wherein the user's list of links she herself created contains the particular group identifiers corresponding to emails in the user's inbox, the email client 122 uses the group identifier information to identify email conversations that have been linked either to another email conversation or to another email. In an example embodiment wherein group identifiers have been stored in the email header information, email client 122 parses the email headers, and in particular the References fields, to identify emails that are part of the same email conversation. Email client 122 further searches for emails that share the same Group-IDs indicating the email conversations to which the emails belong have been linked. In an example embodiment wherein the group identifier information has been stored external to the email header information, email client 122 searches the stored data, which may be recorded in a relational database, for emails that have the same Group-ID in order to identify email conversations that have been linked to other conversations or emails.

Figure 3E:
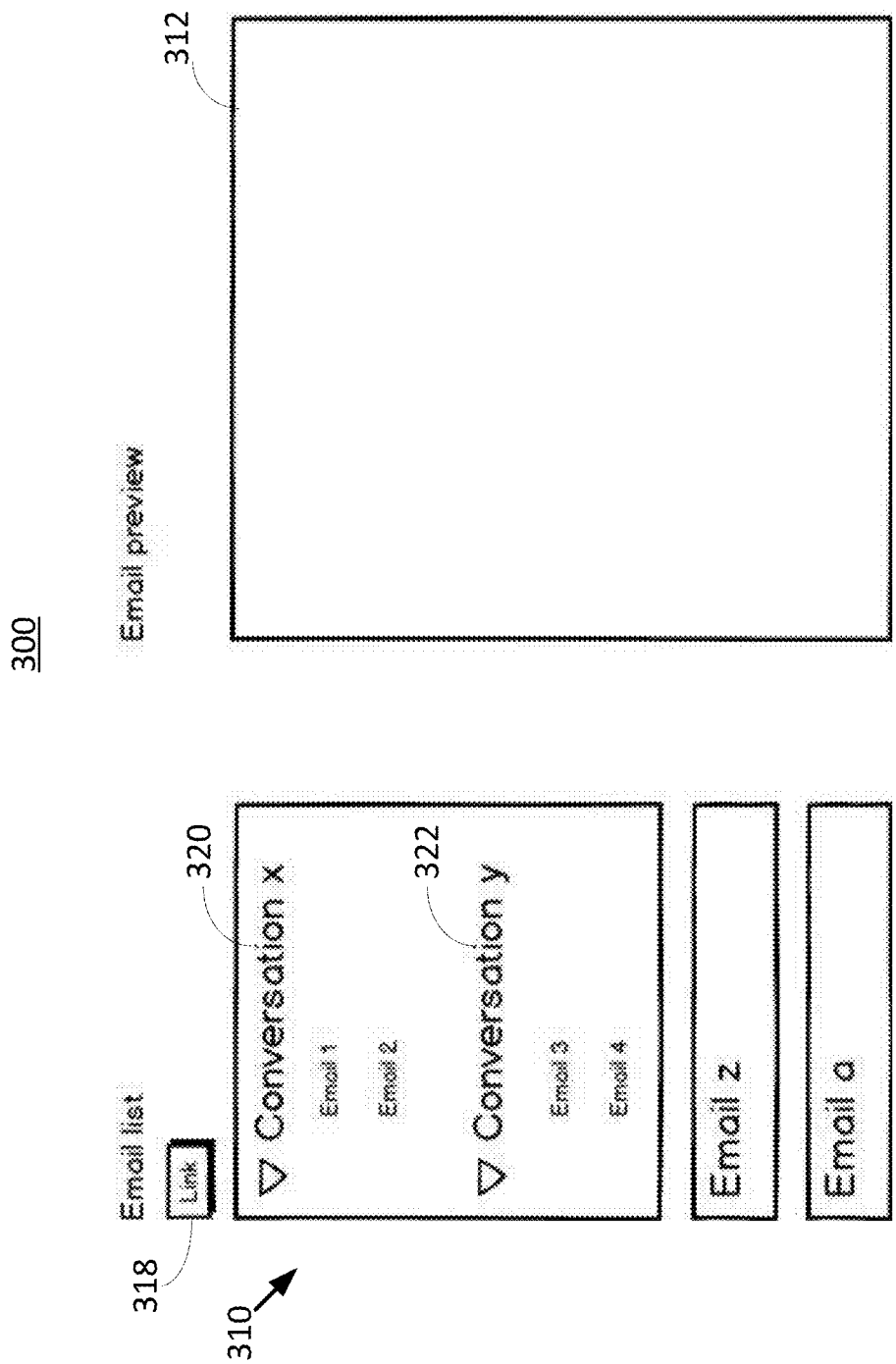

Having identified email conversations and any links to other conversations or emails, client 122 generates and displays graphical user interface data illustrating the linked email conversations. The generated data displays linked email conversations by any appropriate mechanism. FIG. 3*e* depicts an example user interface visibly depicting that two conversations have been linked. As shown, a first email conversation 320 and a second email conversation 322 are shown in close proximity to each other and within a common display pane. It will be appreciated that linked email conversations and emails linked to email conversations may be visually identified in any suitable manner. For example, the linked email conversations may be identified using icons, indentations, or any other suitable visual means.

Linking Email Conversations Previously Linked by Others

According to another aspect of the disclosed embodiments, a first email conversation that has been linked to a second email conversation by a first user may be subsequently linked by a recipient of an email in the first email conversation. The above described process of linking is performed by individual users and applies to the presentation and processing of emails for the individual user who established the link. In other words, when a user links two email conversations as described above, the link applies only for purposes of displaying emails in the particular user's inbox. Without further action, the linking of the email conversations does not apply to the same email conversations when the conversations are displayed by other user's email clients. When an email is received with a Group-ID in its header information, the recipient's email client may determine that while others may have linked the email conversations, the email recipient has not linked the particular email conversation. According to an aspect of the disclosed embodiments, the email client of the recipient may use the existence of the Group-ID to trigger further interface functionality with which the recipient may be alerted that the email is comprised in a conversation that was previously linked and with which the recipient may herself establish a link between the same email conversations.

Figure 4:
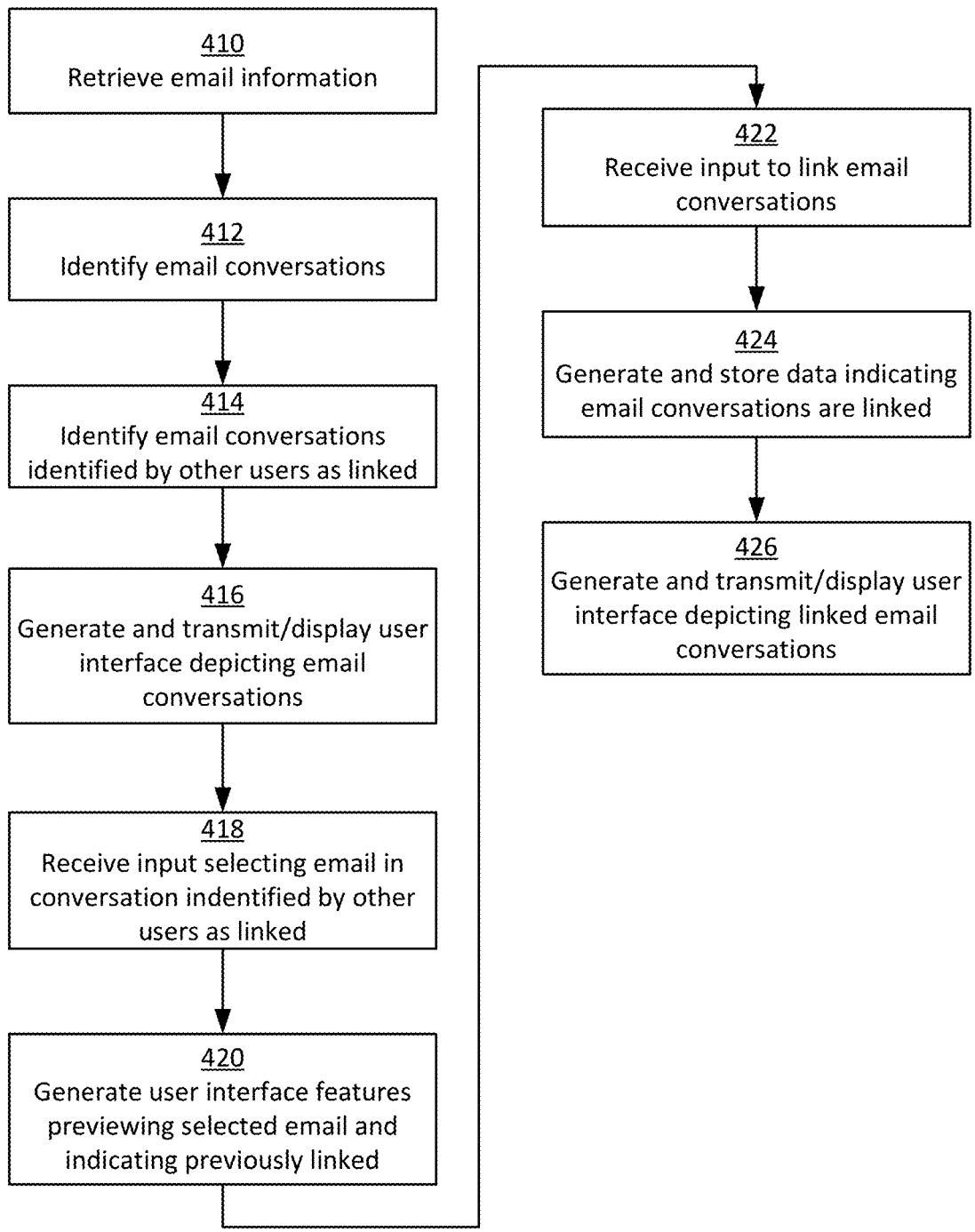
FIG. 4 depicts a flow diagram of an example process for linking an email conversation previously linked by other users.

FIG. 4 depicts a flow diagram of a process by which two email conversations that were previously linked by a user other than the recipient of the message, may be linked by the recipient of the email message. Referring to FIG. 4, at block 410, an email client 122 (FIG. 1) executing on any of client devices 120*a-c* retrieves email information, including email header information, from email service 130. In an example scenario, the retrieved information may comprise email header information including group identifiers, i.e., Group-ID's, created when an email user other than the email recipient linked an email conversation to another. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 412, email client 122 processes the received email data to identify messages that are grouped together and comprise email conversations. In an example scenario, email client 122 parses email header information to identify emails that form conversations. More particularly, email client 122 processes the References field information in the received email information to identify emails that form part of email conversations. The processing may include identifying in a References field an original or first message in a conversation and all subsequent replies flowing from the original message. In an example scenario, email client 122 may parse the References fields to identify the Message-ID's for all emails listed as belonging to an email conversation and retrieving the corresponding email data for the identified Message-ID's.

At block 414, email client 122 identifies which of the identified email conversations are linked to other conversations, and for each of the identified linked email conversations, whether the email recipient has identified the conversations as being linked. In other words, email client 122 determines which email conversations have been linked, and for those linked, which links have been implemented by the recipient. In the scenario where an email has a group identifier, e.g., Group-ID, stored in its header information, email client 122 determines that the particular email has been linked or is part of an email conversation that has been linked. Through further processing of email header information, and in particular by locating emails having the same group identifier, email client 122 identifies the email or email conversation to which the email conversation is linked.

For each identified linked email conversation, email client 122 determines whether the link was implemented by the email recipient. As noted above, each email user maintains a list, i.e., link list, of group identifiers corresponding to linked email conversations the particular user has implemented. As described above, the list may be maintained, for example, in a database or any other suitable manner. Accordingly, email client 122 may compare group identifiers that appear in the email header information with the particular user's list of implemented links to determine for each group identifier in the email header information, whether the particular user has implemented the particular link.

At block 416, email client 122 generates and displays user interface data depicting emails. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Email client 122 also depicts on the user interface an indication of any email conversations that the email client 122 has determined to be linked. Accordingly, in a scenario where the email client 122 has determined by comparison of Group-IDs to the recipient's link list that the recipient has linked conversations, the user interface data indicates the linked conversations by, for example, displaying the email conversations in proximity to each other.

In some instances, email client 122 may determine through its processing of the recipient's link list of group identifiers, that emails in the user's inbox are comprised in email conversations that have been linked by other users but not by the recipient. In other words, email client 122 may determine that group identifiers in the email header information indicate email conversations have been linked, but the recipient's list of group identifiers does not include the group identifier which indicates the recipient has not implemented the particular link. When email client 122 displays emails from the user's inbox, it indicates that the particular email belongs to an email conversation that has been linked by another user and provides a user interface feature to allow the user to likewise implement the same link.

Figure 5A:
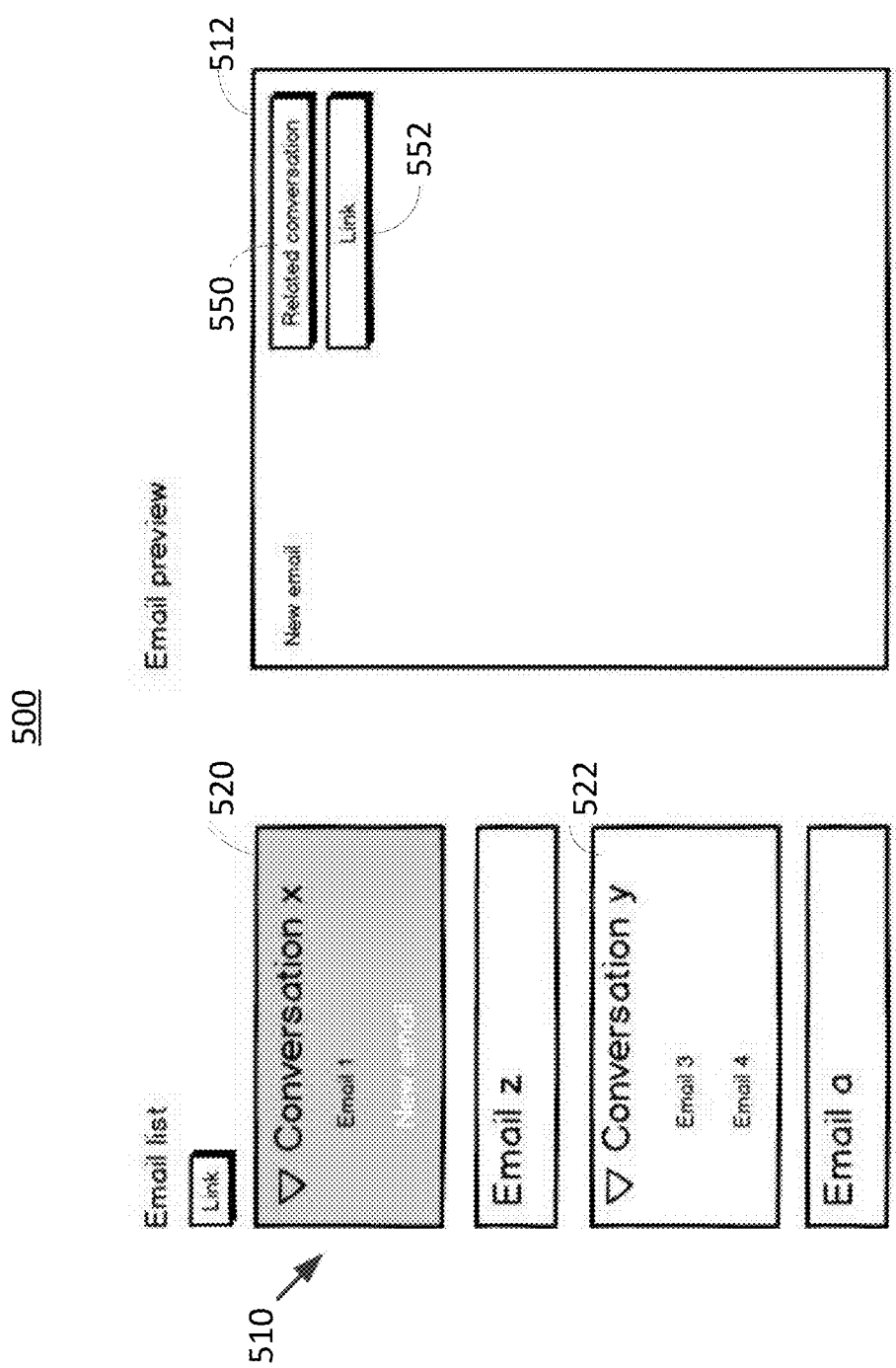
FIGS. 5a-c depict example graphical user interfaces for use in linking an email conversation previously linked by other users.

FIG. 5a depicts an example user interface 500 that may be generated by email client 122 at block 416. As shown, the user interface data generated and displayed by email client 122 may comprise email listing pane 510 and email preview pane 512. Email listing pane 510 displays a listing of emails that email client 122 identified in the email data retrieved from service 130. As shown, email client 122 displays emails that are related to each other, i.e., are comprised in the same email conversation, in groups 520, 522. The emails comprised in an email conversation or group are displayed in proximity to each other. In an example scenario, the email conversations may be designated and differentiated from other emails by additional user interface features such as separate window panes, icons, headings, and indenting. Although not illustrated in FIG. 5a, email client 122 may provide a visual indication that email conversations have been linked by the user. For example, email client 122 may display linked email conversations in proximity to each other and may provide additional user interface features such as a common window pane to distinguish or identify linked email conversations.

At block 418, email client 122 receives inputs selecting emails in the email listing pane 510. Referring to FIG. 5a, in an example scenario depicted, a user has selected "New email" comprised in example email conversation 520.

At block 420, email client 122 generates user interface features so as to provide a preview of the selected email. As emails are selected in email listing pane 510, the text of the selected email may be viewed in preview panel 512. In the scenario wherein a selected email has been identified by email client 122 as belonging to an email conversation that was previously linked to another email conversation by another user, email client 122 generates a user interface feature identifying that a related email conversation exists. In the example embodiment depicted in FIG. 5a, email client 122 generates a text box 550 indicating a related email conversation exists. The text box may comprise any suitable information such as, for example, text indicating the email conversation that is related to the selected email. In an example embodiment, text box 550 may be selectable, and in response to being selected may cause email client 122 to provide additional information regarding the related email conversation. For example, email client 122 may cause the interface to present a user pane listing the linked email conversation. In the context of the example scenario of FIG. 5a, the interface may present information indicating the related conversation is email conversation 522.

Figure 5B:
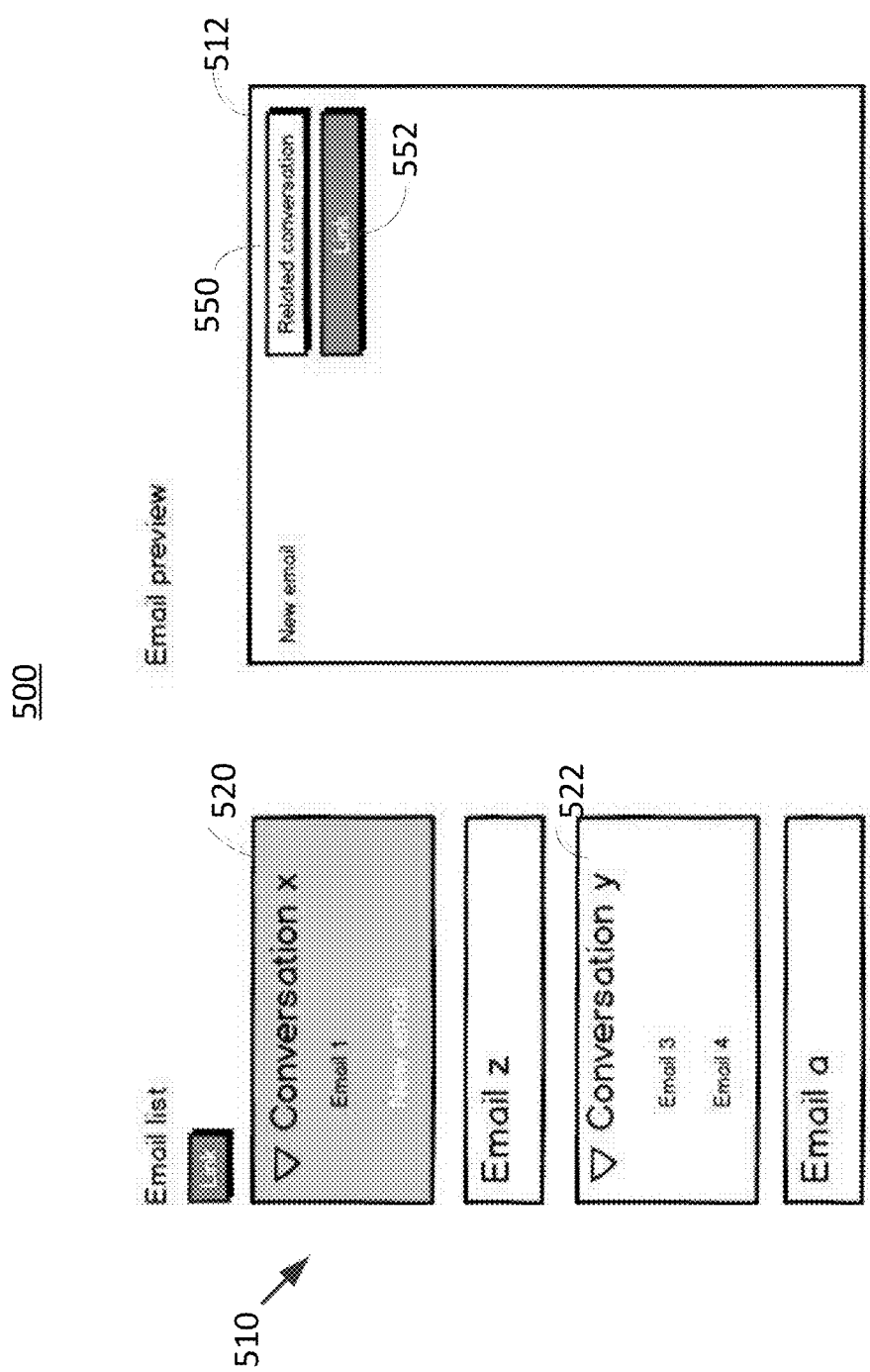

The generated user interface 500 may further comprise a user interface feature that is selectable by the user to request that the email and its conversation be linked by the current user to the conversation to which the email was previously linked by another user. In the example embodiment of FIG. 5a, the user interface comprises selectable button 552. It will be appreciated that any suitable user interface feature may be used. As show in FIG. 5b, the user may depress the selectable button 552 in order to initiate processing to have the email conversations linked.

Referring back to FIG. 4, at block 422, email client 122 receives the user input originating from the user interface 500 and indicating the user has selected link button 552. The inputs may specify the particular email, e.g., "New email," and the selection to link the email and its conversation to the email conversation previously linked to by another user. The input may be used by email client 122 in further processing.

At block 424, email client 122 generates and stores data establishing for the particular user a link between the email conversation to which the selected email belongs and the email conversation to which the email was previously linked by another user. Email client 122 stores in the link list maintained for the particular user information indicating an association or link has been established between the two relevant email conversations. In an example scenario, email client 122 stores in the user's link list the group identifier, e.g., Group-ID, from the header information for linking the two conversations. By storing the Group-ID in the link list maintained for the current email recipient, the link between the two email conversations that was previously implemented by another user will, going forward, be recognized for the current email recipient.

Figure 5C:
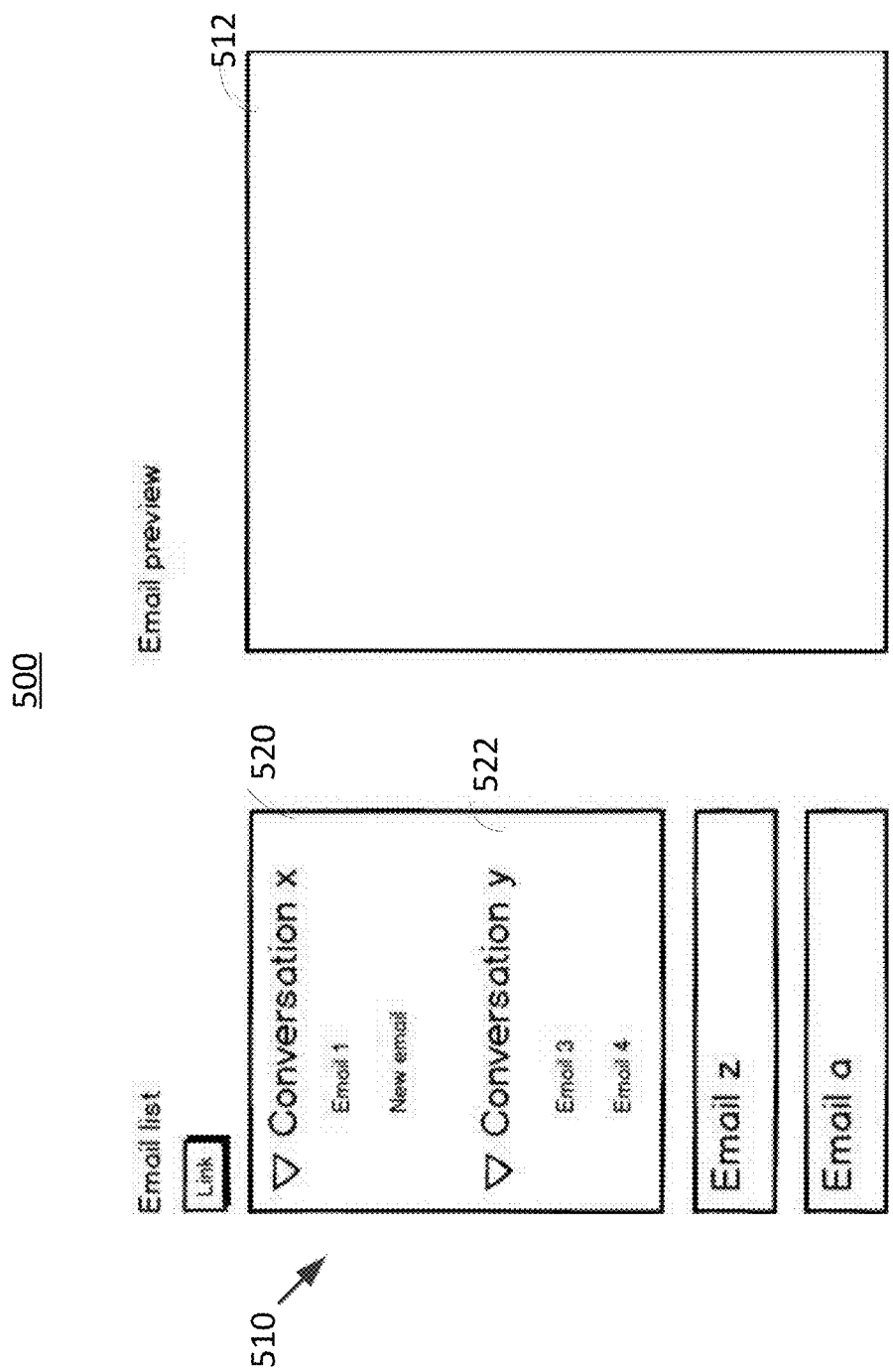

At block 426, email client 122 processes the received data and the newly stored data, including the relationship of the Group-ID to the particular email recipient, to generate and transmit user interface data for displaying the linked email conversations. Having established a link between email conversations for the particular email recipient, email client 122 generates and displays graphical user interface data illustrating the linked email conversations. The generated data displays linked email conversations by any appropriate mechanism. FIG. 5c depicts an example user interface visibly depicting that two conversations have linked. As shown, a first email conversation 520 and a second email conversation 522 are shown in close proximity to each other and within a common display pane. It will be appreciated that linked email conversations and emails linked to email conversations may be visually identified in any suitable manner. For example, the linked email conversations may be identified using icons, indentations, or any other suitable visual means.

Linking New Emails with Email Conversations

According to another aspect of the disclosed embodiments, a new email may be generated and linked to an existing email conversation. Typically, in existing systems, an email will only become associated with another email when the email is a reply to a previous email. Users cannot proactively decide which emails may relate to other groupings of emails. In the systems and methods disclosed herein, a new email may be created, one that is not a reply to an earlier email, and be linked to an existing email conversation. Accordingly, email users are able to leverage control over creating relationships between emails, where previously the email user had no control.

Figure 6:
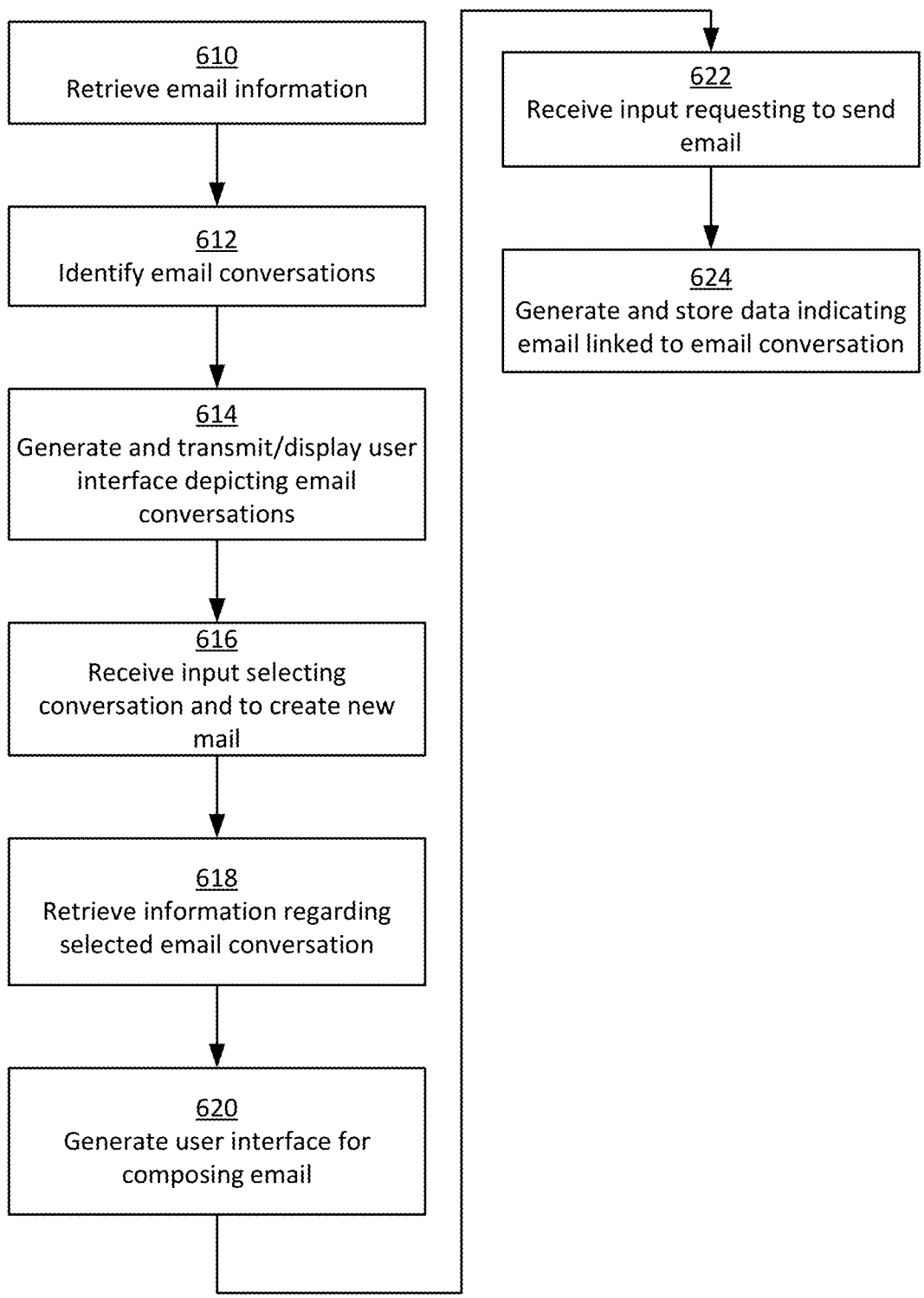
FIG. 6 depicts a flow diagram of an example process for linking a new email to an email conversation.

FIG. 6 depicts a flow diagram of a process by which a new email may be linked to an existing email conversation. At block 610, an email client 122 (FIG. 1) executing on any of client devices 120a-c retrieves email information, including email header information, from email service 130. In an example scenario, the retrieved information may comprise email header information including group identifiers, i.e., Group-ID's, created when an email user linked an email conversation to another. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 612, email client 122 processes the received email data to identify messages that are grouped together in email conversations. In an example scenario, email client 122 parses email header information to identify emails that form conversations. More particularly, email client 122 processes the References field information in the received email information to identify emails that form part of email conversations. The processing may include identifying in a References field an original or first message in a conversation and all subsequent replies flowing from the original message. In an example scenario, email client 122 may parse the References fields to identify the Message-ID's for all emails listed as belonging to an email conversation and retrieving the corresponding email data for the identified Message-ID's.

At block 614, email client 122 generates and displays a user interface listing emails in the user's inbox. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Figure 7A:
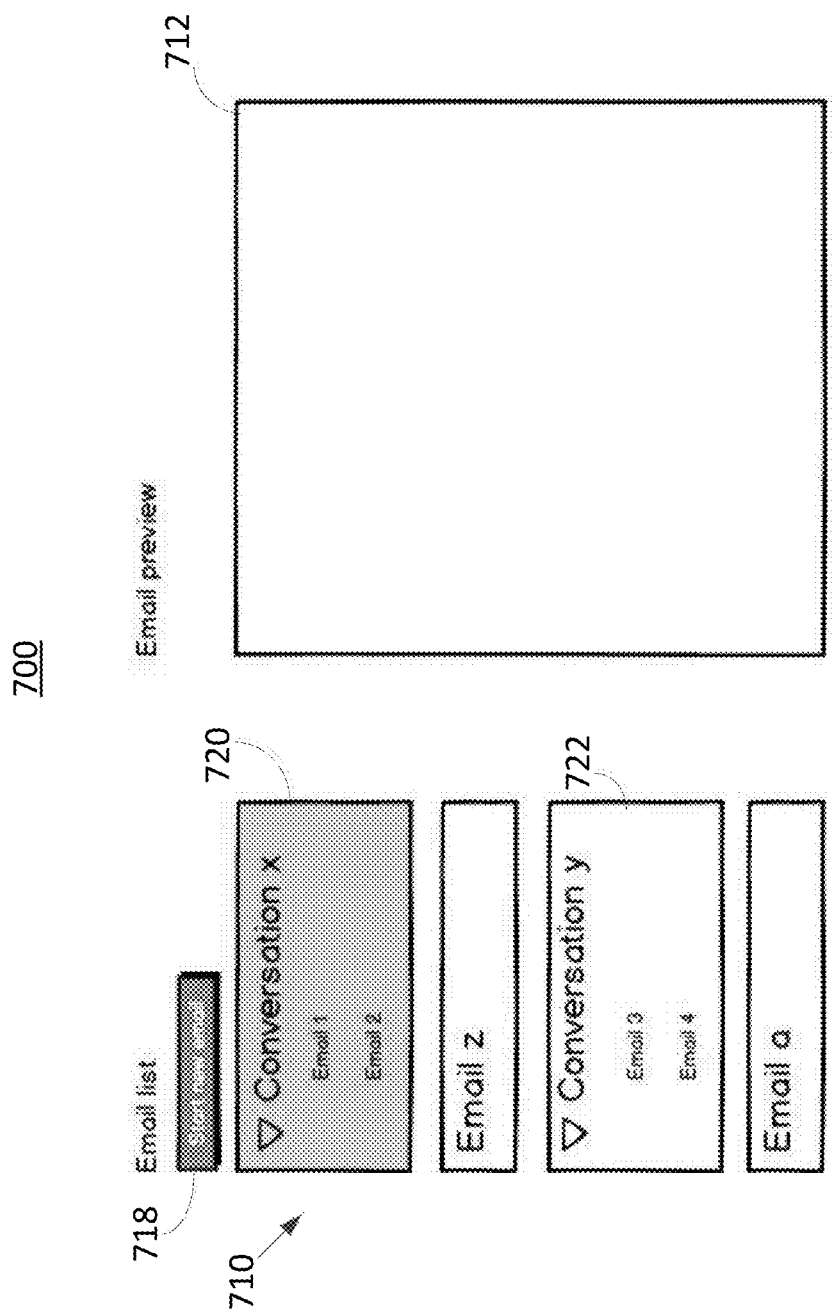
FIGS. 7a-c depict example graphical user interfaces for use in linking a new email to an email conversation.

FIG. 7a depicts an example user interface 700 that may be generated by email client 122 at block 614. As shown, in an example embodiment, the user interface data generated and displayed by email client 122 comprises email listing pane 710 and email preview pane 712. Email listing pane 710 displays a listing of emails that email client 122 identified in the email data retrieved from service 130. As shown, email client 122 displays emails that are related to each other, i.e., are comprised in the same email conversation, in groups 720, 722. The emails comprised in an email conversation or group are displayed in proximity to each other. In an example scenario, the email conversations may be designated and differentiated from other emails by additional user interface features such as separate window panes, icons, headings, and indenting. Although not illustrated in FIG. 7a, email client 122 may provide a visual indication that email conversations have been linked by the user. For example, email client 122 may display linked email conversations in proximity to each other and may provide additional user interface features such as a common window pane to distinguish or identify linked email conversations.

The generated user interface may be adapted to allow users to create new emails, emails not sent as a reply to a received email, and to link the new emails with existing groups of emails such as existing email conversations. In the example embodiment of FIG. 7a, email user interface 700 comprises user interface feature 718. User interface feature 718 may be a button which when selected generates input requesting to create a new email. Any of the email conversations 720, 722 may be selected prior to selecting button 718. When, as depicted in FIG. 7a, email conversation 720 is selected and new email button 718 is also selected, input is generated requesting to create a new email that is to be linked to the selected email conversation 720.

At block 616, email client 122 receives the inputs from the generated user interface selecting an email conversation and selecting to start a new email. In response, at block 618, email client 122 retrieves information from email headers regarding the selected email conversation. Information that email client 122 may later make available to the user preparing the new email may be retrieved. For example, email client 122 may retrieve information regarding the recipients of the emails in the particular email conversation. Similarly, email client 122 may retrieve information regarding the attachments to the emails in the particular email conversation.

Figure 7B:
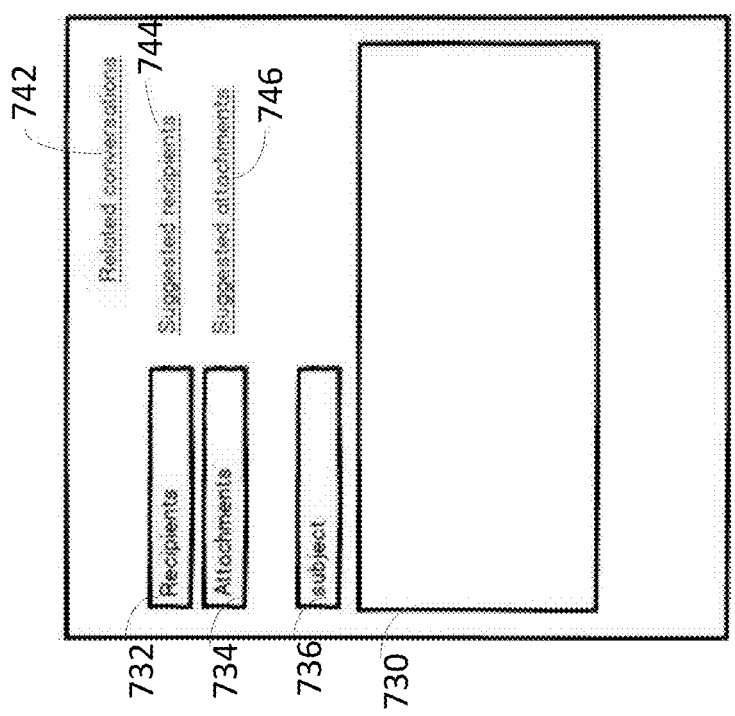

At block 620, email client 122 generates and displays a user interface for use in composing an email. FIG. 7b depicts an example user interface. As shown, the user may enter the text of the email into area 730. The subject of the text may be entered into text box 736. Intended recipients are received into area 732 and attachments may be specified in area 734.

In view of the email having been identified as being linked to email conversation 720, email client 122 provides mechanisms to access the information retrieved at step 618 from the mail header information for the various emails in email conversation 720. In an example embodiment, the user interface may comprise user interface features such as a link with which to access suggested recipients 744 and to access suggested attachments 746. If the user selects to access suggested recipients link 744, email client 122 presents the recipients that email client 122 retrieved at step 618 from the email header information for the first email conversation. Similarly, if the user selects to access suggested attachments link 746, email client 122 presents the attachments that were retrieved from the email header information for the emails in the first email conversation. In the example embodiment depicted in FIG. 7a, the user interface also comprises a related conversations link 742 which when selected causes email client 122 to provide information regarding the email conversation to which the email is being linked. For example, email client 122 may have retrieved at step 618 information regarding the number of emails in the email conversation, the topic of the email conversation, or any other information regarding the linked conversation which a user may find useful.

At block 622, the user requests to send the email.

At block 624, email client 122 generates and stores data representing or indicating a link between the email and the selected email conversation. In an example embodiment, email client 122 generates an identifier corresponding to the link between the generated email and the selected email conversation. The identifier is stored in relation to the first email conversation and the generated email. Similar to the discussion above in connection with FIG. 2, the identifier may have any form suitable for identifying that an email conversation or group of emails is linked to an email. In an example embodiment, the generated identifier is derived from or comprises email header information identifying the generated email and the selected email conversation. More particularly, the email header information may comprise a Message-ID created for the new email and a Message-ID from the References field of the email conversation. In an example embodiment, the Message-ID of the original or first email in the email conversation is used.

The generated identifier may be referred to as a Group-ID and may be stored in relation to the new email and the email conversation consistent with the discussion above in connection with FIG. 2. In an example embodiment, email client 122 may store the generated group identifier in the header information of the new email and in the header information for each of the emails that are associated with the selected email conversation. Email client 122 may store the information wherever the email header information resides including on the client device 120 and/or on service 130. It will be appreciated that the group identifier information stored in the header travels with the email. Accordingly, when the email including its header information is received at another user's inbox, the group identifier will be available for processing by the email client of the recipient.

Similar to the description above in connection with FIG. 2, email client 122 may store the generated group identifier external to the email header information. For example, email client 122 may store the generated group identifier in a database along with information indicating that the group identifier corresponds to the new email and each of the emails that are comprised in the selected email conversations. Email client 122 may store the information wherever the email header information resides including on the client device 120 and/or on service 130.

The generated group identifier will also be stored in a link list that lists groupings the particular user/owner/operator has herself implemented. For example, the generated Group-ID may be stored with Group-IDs for other links that this particular user has implemented herself. As noted above, email client 122 may subsequently use the information in the link list to distinguish linked email conversations that the particular user/owner/owner has herself created from those that other users have created. The list of group identifiers corresponding to email conversation links the user herself has created may be stored in any manner and in any location suitable to be operable. In an example embodiment, the list may be stored in a database that is maintained locally on client device 120 and/or on storage 132 in email service 130.

Figure 7C:
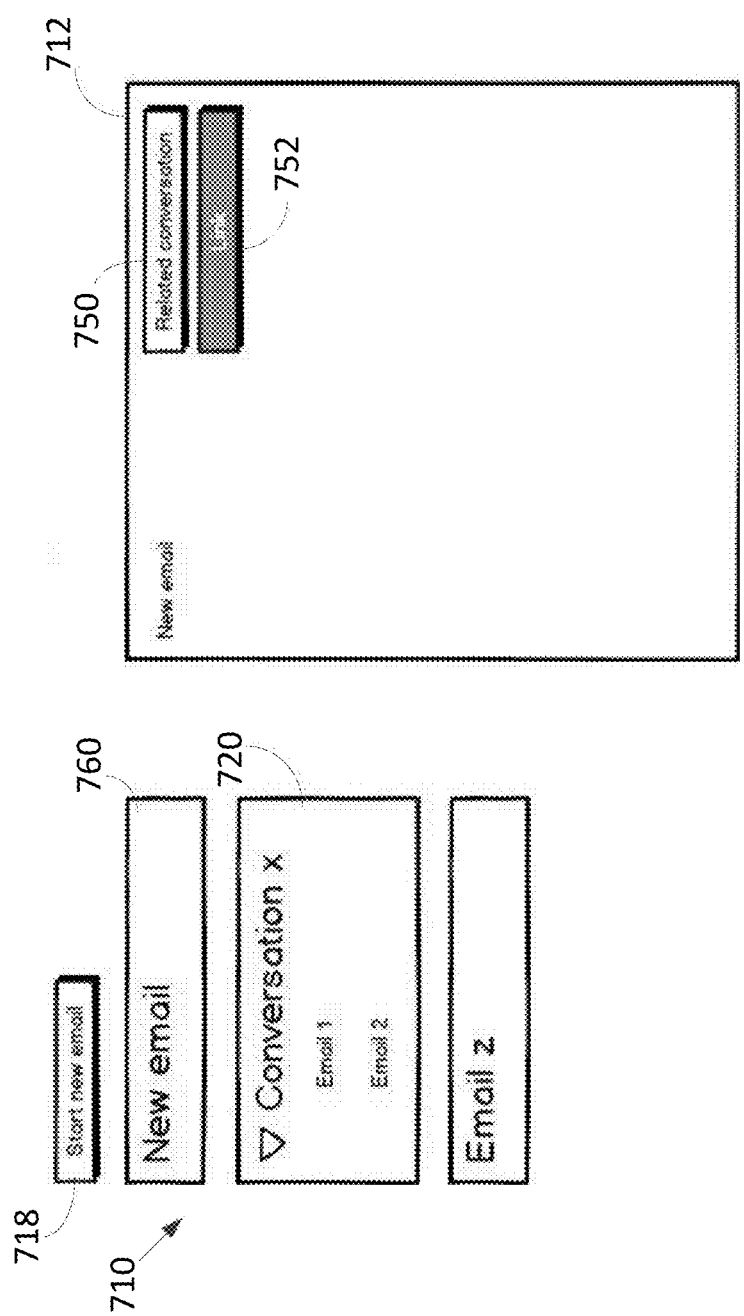

FIG. 7c depicts a user interface generated by email client 122 of a recipient of the newly generated email. FIG. 7c operates similarly to FIG. 5a above. As shown, the newly generated email 760 is shown in the email listing 710 at the recipient's email client. When the new email 760 is selected in the email listing 710, the email is previewed in preview pane 712. As described above in connection FIG. 5b, email client 122 notifies the recipient that the email was previously linked to an email conversation by displaying related conversation button 750. Further, and consistent with the description above, the user may implement the link herself by selecting link button 752. The recipient's email client 122 will thereafter recognize the email is linked with the selected email conversation and will display it accordingly when it presents the email in the email listing 710.

Creating Email Conversations from an Existing Email Conversation

According to an aspect of the disclosed embodiments, a new email conversation may be created from an email in an existing email conversation. Typically, in existing systems, an email becomes associated with an existing email conversation when the email is sent in reply to a prior email. When a reply email is received in a user's inbox, the email has already been classified as belonging to an existing conversation and is displayed with the particular conversation. In some instances, a recipient of a reply email may be of the opinion that the email is not, in fact, related to the others in the email conversation and may wish to have the reply displayed in a separate email conversation. Existing systems do not provide the capability for users to selectively place emails that are part of an existing conversation into a new conversation.

Figure 8:
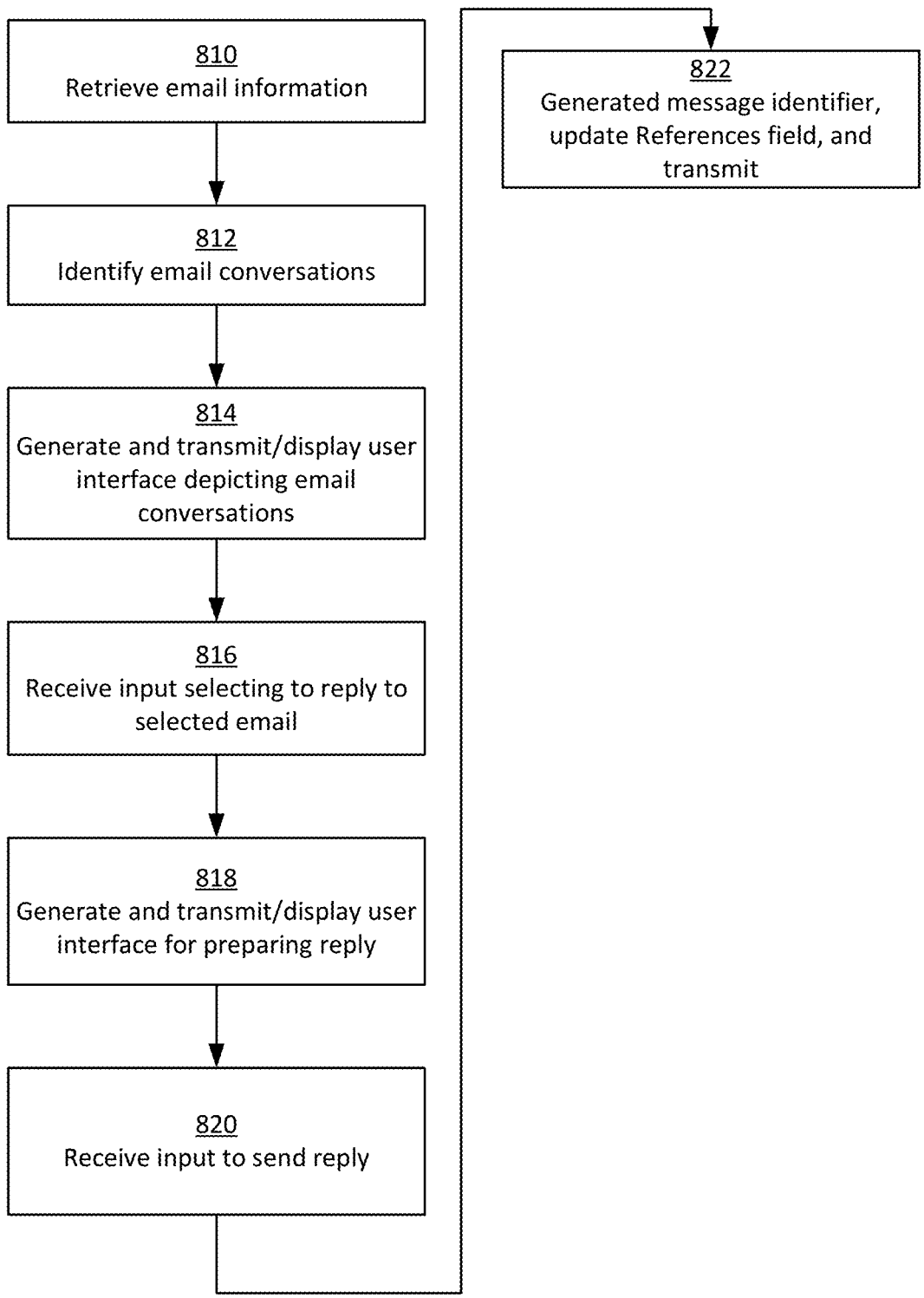
FIG. 8 depicts a flow diagram of an example process for replying to an email in an email conversation.

Applicants disclose herein systems and methods whereby a user may select an email from an existing email conversation and begin a new conversation starting with the selected email. In other words, a new email conversation may be created from an existing email conversation. Put differently, a part or portion of an existing email conversation, i.e., an email, may be converted to a new email conversation. FIG. 8 is a diagram depicting example processing that may be performed by email client 122 in replying to an email that is part of an existing email conversation. As shown, at block 810, an email client 122 executing on any of client devices 120a-c retrieves email information, including email header information, from email service 130. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 812, email client 122 processes the received email data to identify messages that have been grouped together as corresponding to an email conversation. In an example scenario, email client 122 parses email header information to identify emails that form part of conversations. More particularly, email client 122 processes the References field information in the received email information to identify emails that form part of email conversations. This may involve parsing the References field to identify the Message-ID's for all emails listed as belonging to an email conversation and retrieving the corresponding email data for the identified Message-ID's.

At block 814, email client 122 generates and transmits for display user interface data depicting emails. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Figure 9A:
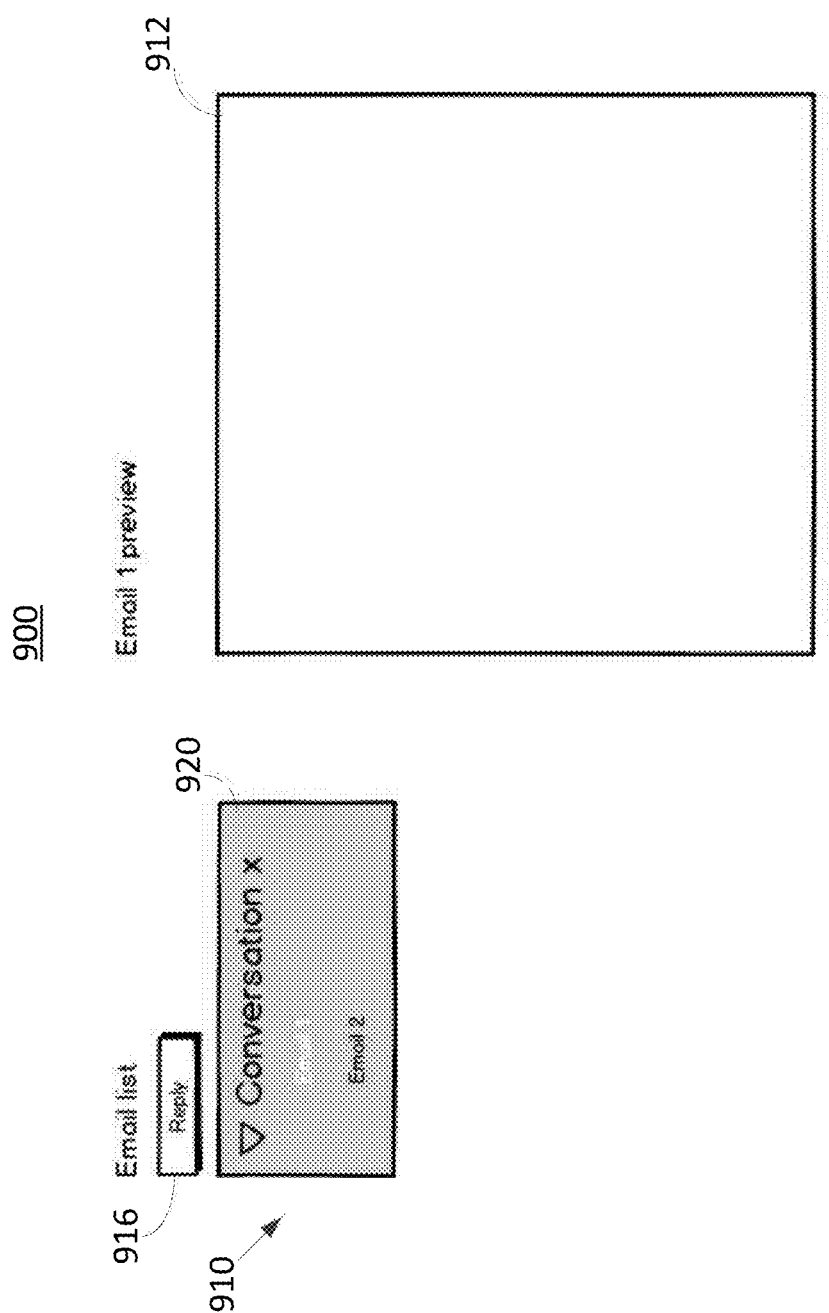
FIGS. 9a-b depict example graphical user interfaces for use in replying to an email in an email conversation.

FIG. 9a depicts an example user interface 900 that may be generated by email client 122 at block 814. As shown, the user interface data generated and displayed by email client 122 may comprise email listing pane 910 and email preview pane 912. Email listing pane 910 displays a listing of emails that email client 122 identified in the email data retrieved from service 130. As shown, email client 122 displays emails that are related to each other, i.e., are comprised in the same email conversation, in groups 920. The emails comprised in an email conversation or group 920 are displayed in proximity to each other. In an example scenario, the email conversations may be designated and differentiated from other emails by additional user interface features such as separate window panes, icons, headings, and indenting. Email preview pane 912 displays the text of emails as the emails are selected in email listing 910.

As shown, user interface 900 further comprises a reply button 916. As depicted in FIG. 9a, a user may select an email in email listing 910 and select reply button 916. In the example scenario depicted in FIG. 9a, the user has selected "Email 1" in "Conversation x" and selected reply button 916.

Figure 9B:
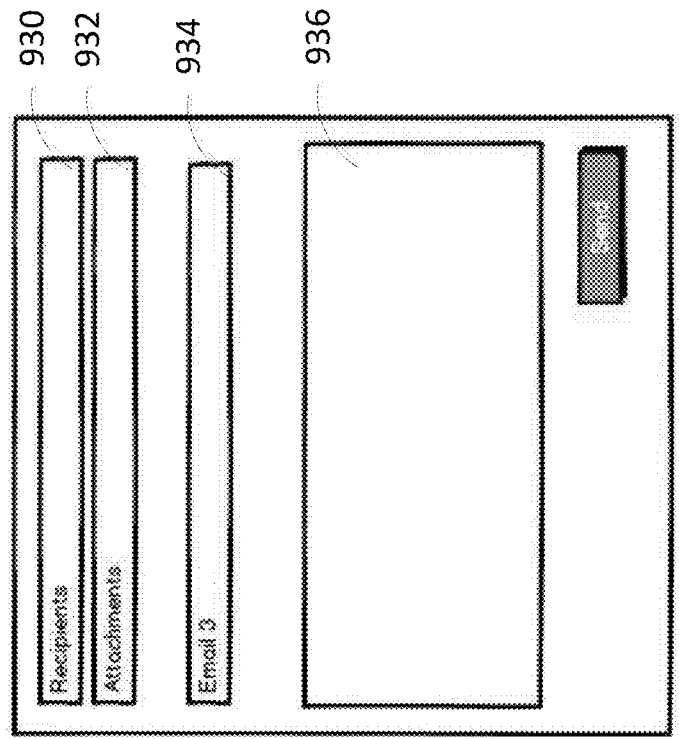

Referring to FIG. 8, at block 816, email client 122 receives the input from the user interface selecting a particular email and selecting to reply. In response, at block 818, email client 122 generates and transmits for display a user interface for preparing a reply. FIG. 9b depicts an example user interface for preparing a reply email. As shown, the user interface comprises areas for listing intended recipients 930 and attachments 932. In the example scenario depicted, the subject area 934 is titled "Email 3" which is a reply to original Email 1. The user enters the text of the reply email in area 936.

Referring back to FIG. 8, at block 820, email client 122 receives the reply email input entered by the user. At block 822, email client 122 generates a message identifier, i.e., Message-ID, for the new email, updates the references field to indicate the email is in reply to Email 1, and transmits the mail with its header information to email service 130 for forwarding to the intended recipient.

Figure 10:
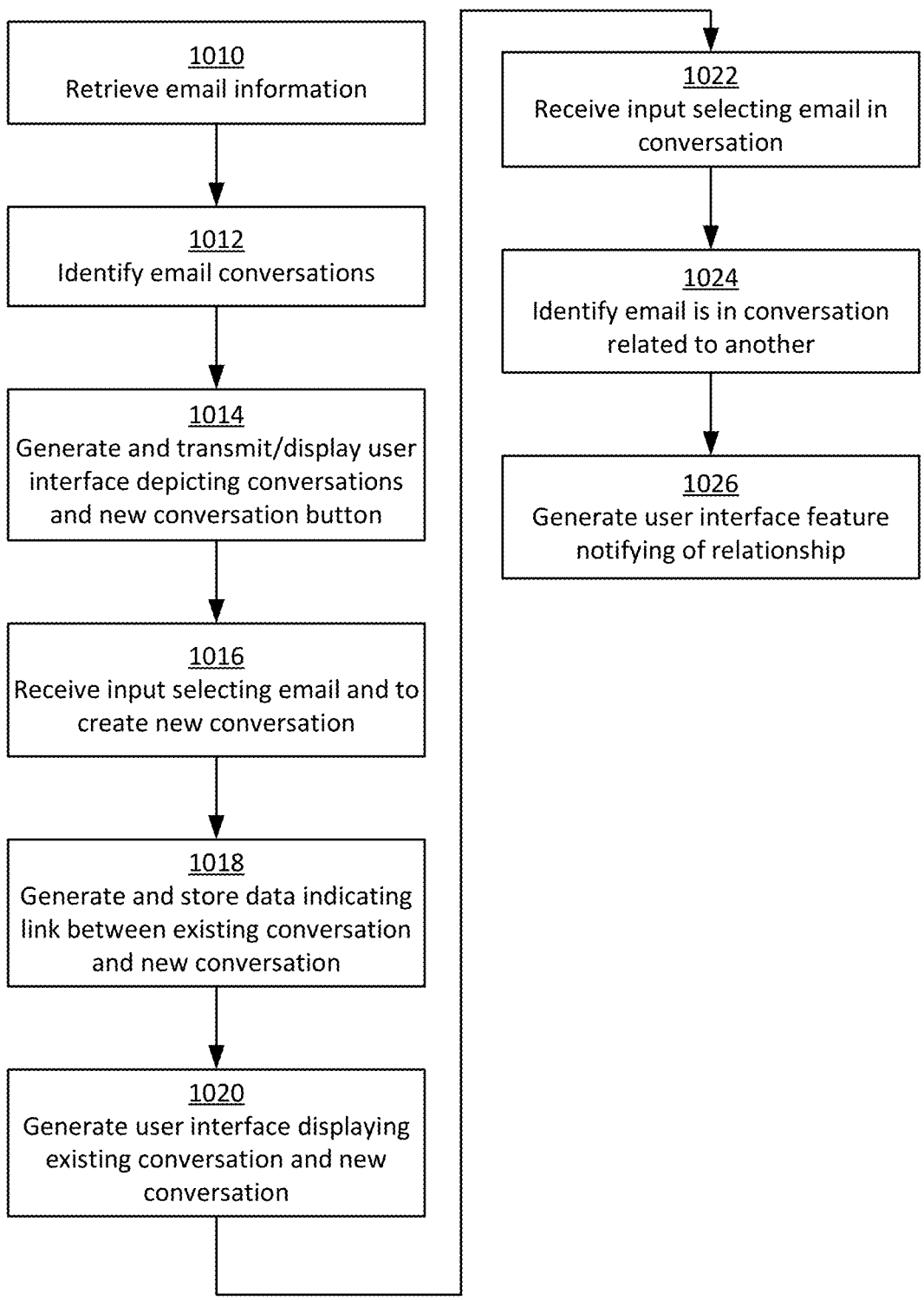
FIG. 10 depicts a flow diagram of an example process for converting part of an existing email conversation to a new email conversation.

FIG. 10 is a diagram depicting example processing performed by the email client at the email recipient. The diagram depicts processing that may be performed by email client 122 in creating an email conversation from an email in an existing email conversation. As shown, at block 1010, an email client 122 executing on any of client devices 120*a-c* retrieves email information, including email header information, from email service 130. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 1012, email client 122 processes the received email data to identify messages that have been grouped together as corresponding to an email conversation. In an example scenario, email client 122 parses email header information to identify emails that form part of conversations. More particularly, email client 122 processes the References field information in the received email information to identify emails that form part of email conversations. This may involve parsing the References field to identify the Message-ID's for all emails listed as belonging to an email conversation and retrieving the corresponding email data for the identified Message-ID's.

At block 1014, email client 122 generates and transmits for display user interface data depicting emails. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Figure 11A:
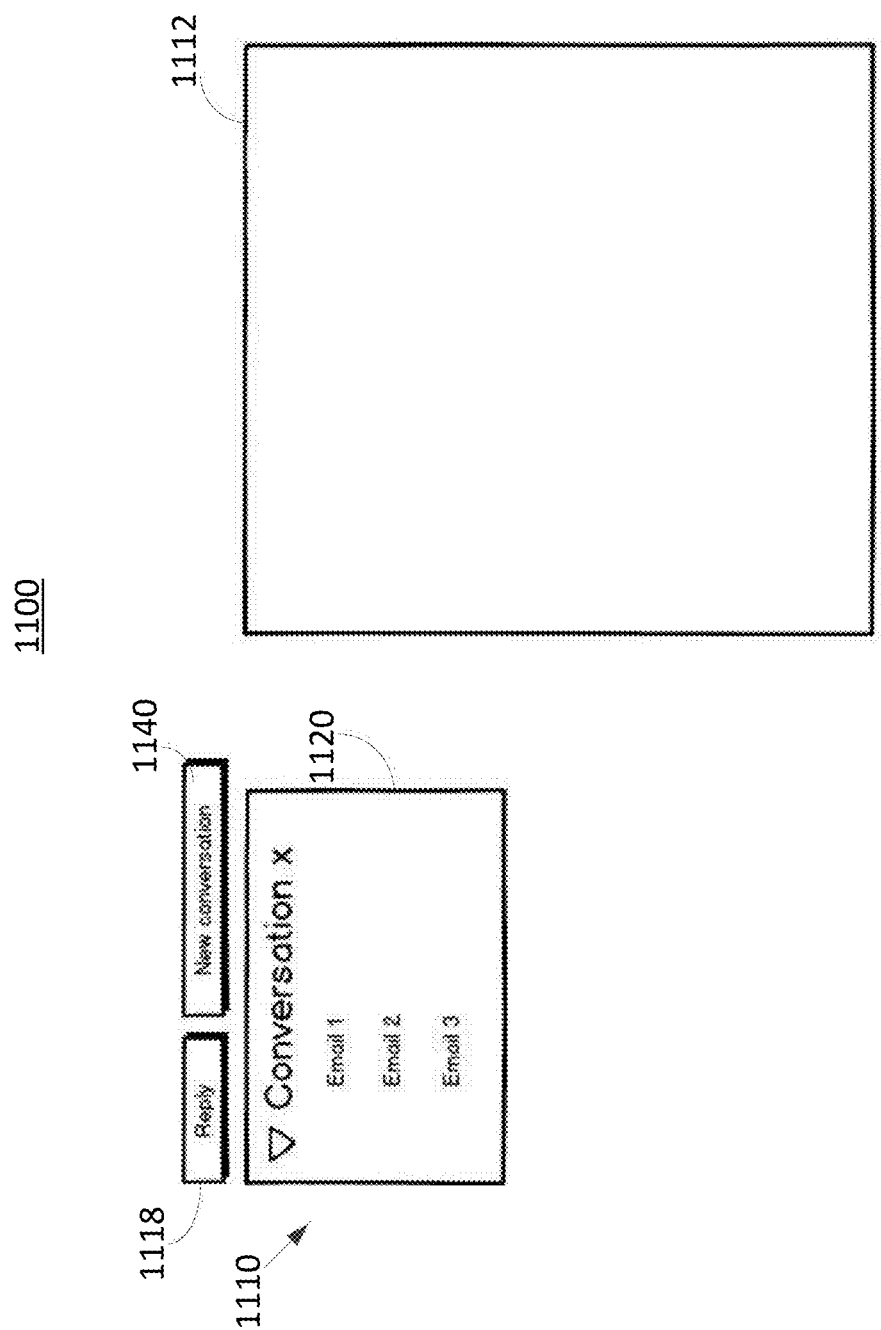
FIGS. 11a-e depict example graphical user interfaces for use in converting part of an existing email conversation to a new email conversation.

FIG. 11*a* depicts an example user interface 1100 that may be generated by email client 122 at block 1014. As shown, the user interface data generated and displayed by email client 122 may comprise email listing pane 1110 and email preview pane 1112. Email listing pane 1110 displays a listing of emails that email client 122 identified in the email data retrieved from service 130. As shown, email client 122 displays emails that are related to each other, i.e., are comprised in the same email conversation, in groups 1120. The emails comprised in an email conversation or group 1120 are displayed in proximity to each other. In an example scenario, the email conversations may be designated and differentiated from other emails by additional user interface features such as separate window panes, icons, headings, and indenting. Email preview pane 1112 displays the text of emails as the emails are selected in email listing 1110.

Figure 11B:
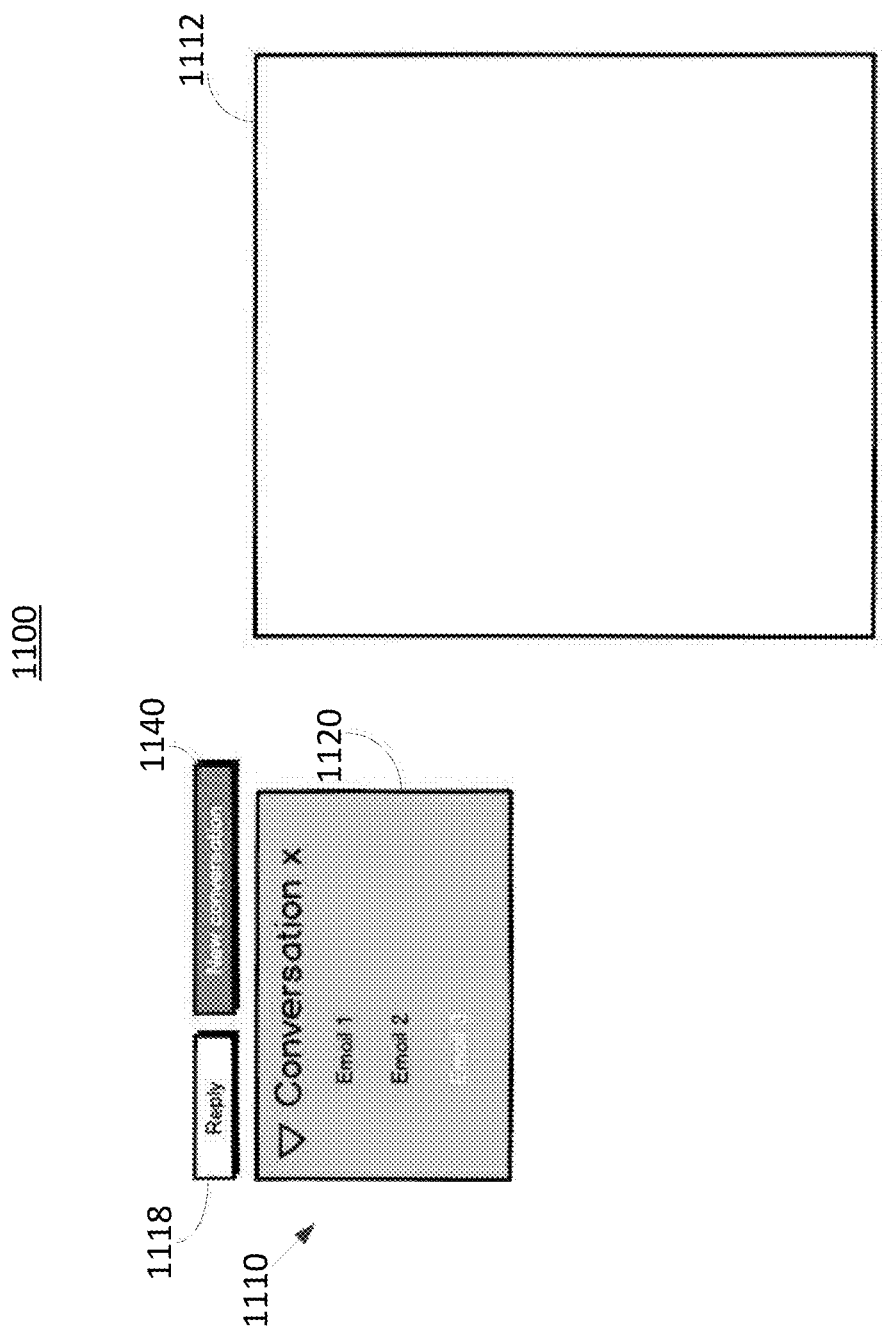

Upon review of the emails in her inbox, a user may determine that a particular email should be displayed as in its own conversation. User interface 1100 further comprises a user interface feature with which users may select to create a new conversation using an email from an existing conversation. In the example embodiment of FIG. 11*a*, user interface 1100 comprises new conversation button 1140. As is depicted in FIG. 11*b*, a user may select an email in the displayed conversation 1120, which comprises three emails, and then select new conversation button 1140. In the example scenario depicted in FIG. 11*b*, the user has selected Email 3 in conversation 1120, and has also selected new conversation button 1140.

Referring back to FIG. 10, at block 1016, email client 122 receives the inputs originating in the graphical user interface 300. The received information may comprise, for example, an identification of the selected email and an indication that the user has selected to create a new email conversation.

At block 1018, email client 122 generates and stores data representing or indicating a link between the existing conversation, e.g., Conversation x, and a new conversation comprising the selected email, e.g., Email 3. In an example embodiment, email client 122 generates an identifier corresponding to the requested link between the first email conversation and the second email conversation. The identifier is stored in relation to the first or existing email conversation and the second or new email conversation. Similar to the discussion above in connection with FIG. 2, the identifier, which is a group identifier, may have any form suitable for identifying that an email conversation or group of emails is linked to another email conversation. In an example embodiment, the generated identifier is derived from or comprises email header information identifying the generated email, which is comprised in the new email conversation, and the selected email conversation. More particularly, the email header information may comprise a Message-ID created for the email in the new email conversation and a Message-ID from the References field of the existing email conversation. In an example embodiment, the Message-ID of the original or first email in the email conversation is used. Referring to the scenario depicted in FIG. 11*b*, where Conversation x has an original email, Email 1, and the user has selected Email 3 for creation of a new conversation, the generated group identifier may comprise the Message-ID of Email 1, which is the original email in the conversation, and the Message-ID of Email 3, which is the selected email. Based upon the user inputs, for purposes of displaying emails for this particular user, Email 3 is the original email for the new email conversation.

The generated identifier may be referred to as a Group-ID and may be stored in relation to the new email and the email conversation consistent with the discussion above in connection with FIG. 2. In an example embodiment, email client 122 may store the generated group identifier in the header information of the selected email, e.g., Email 3, and in the header information for each of the emails, e.g., Email 1 and Email 2, that are associated with the existing email conversation. Email client 122 may store the information wherever the email header information resides including on the client device 120 and/or on service 130. It will be appreciated that the group identifier information stored in the header travels with the email. Accordingly, when the email including its header information is received at another user's inbox, the group identifier will be available for processing by the email client of the recipient.

Similar to the description above in connection with FIG. 2, email client 122 may store the generated group identifier external to the email header information. For example, email client 122 may store the generated group identifier in a database along with information indenting that the group identifier corresponds to the new email and each of the emails that are comprised in the selected email conversations. Email client 122 may store the information wherever the email header information resides including on the client device 120 and/or on service 130.

The generated group identifier will also be stored in a link list that lists groupings the particular user/owner/operator has herself implemented. For example, the generated Group-ID may be stored with Group-IDs for other links that this particular user has implemented herself. As noted above, email client 122 may subsequently use the information in the link list to distinguish linked email conversations that the particular user/owner/operator has herself created from those that other users have created. The list of group identifiers corresponding to email conversation links the user herself has created may be stored in any manner and in any location suitable to be operable. In an example embodiment, the list may be stored in a database that is maintained locally on client device 120 and/or on storage 132 in email service 130.

At block 1020, email client 122 generates a user interface for displaying the emails in the user's inbox. For example, email client 122 may refresh the view to show the requested new conversation has been created. In connection with preparing the updated user interface, email client 122 processes the email header information of the emails in the particular user's inbox in order to identify the conversations and corresponding emails. For example, email client 122 may process the email header information in order to identify from the References fields in the header information that a first conversation, e.g., Conversation x, is defined. In the example scenario as depicted above in FIG. 11*b*, the References fields may indicate the email conversation comprises Email 1, Email 2, and Email 3. Email 3 may continue to be identified in the header information as belonging to the first conversation even after being designated to be part of a new conversation as described above in connection with block 1016. Similar to as described above in connection with linking email conversations, the creation of a new conversation from an existing conversation applies only to the particular user who implements the creation of the new conversation. For users other than the one that implemented the new conversation, any newly created conversations do not apply until the user whose inbox it is actually implements the creation of the new conversation. The email header information needs to be backward compatible so as to be consistent with other users' inboxes. Accordingly, Email 3 continues to be included in the References field corresponding to the original email conversation so as to maintain consistency with the data as it appears in the email boxes of other users.

Even though the email header information continues to indicate that Email 3 is included in the first existing conversation, email client 122 is able to identify that the user has indicated it should be included in a new conversation. In particular, email client 122 is able to identify from the composition of the group identifier, in combination with the content of the email references data, that the user intended to create a new email conversation. For example, email client 122 may identify that group identifier, Group-ID, contains two Message-IDs that are both contained in the same References field. In a typical scenario of linked email conversations, the Message-IDs contained in a Group-ID correspond to separate conversations which are identified by the original or first email in the references field of each conversation. In the instance that email client 122 determines the Message-ID's comprised in the Group-ID are both identified in the References field data as belonging to the same conversation, email client 122 identifies that the user's intent was to display the emails as comprising two conversations. In particular, email client 122 identifies the first conversation, which may correspond to Conversation x of FIG. 11*a*, as comprising emails identified in the References field beginning with the Message-ID of the original or first email and including all emails for Message-IDs in the References field up through and including the Message-ID located just prior to the Message-ID that forms the second portion of the Group-ID. Email client 122 determines that any Message-ID's appearing after the Message-ID that forms the second portion of the Group-ID is part of the second or new email conversation.

In an example scenario as depicted above in connection with FIG. 11*a*, the Message-IDs of Email 1, Email 2, and Email 3 may be as follows:
Email 1 Message-ID: 1111111111111111111111@example.com
Email 2 Message-ID: 2222222222222222222222@example.com
Email 3 Message-ID: 3333333333333333333333@example.com
In such a scenario, the References field associated with Email 3 may be as follows:
References: <1111111111111111111111@example.com> <2222222222222222222222@example.com> <3333333333333333333333@example.com>
And the Group-ID that was created to indicate two conversations, e.g., existing Conversation x and the new conversation, are linked may be as follows:
Group-ID: <1111111111111111111111@example.com> <3333333333333333333333@example.com>
In this particular scenario, email client 122 identifies that the Group-ID is composed of two Message-IDs, both of which appear in the references file associated with Email 3. Email client 122 determines that in such a scenario, two email conversations are intended, with the first email conversation comprising emails corresponding to Message-ID in the References field beginning with the first or original email, i.e., Message-ID 1111111111111111111111@example.com, and including all emails corresponding to Message-IDs listed in the References field up until just prior to the Message-ID designated as the second portion of the Group-ID, i.e., Message-ID 3333333333333333333333@example.com. In this particular scenario, the Message-IDs listed in the References field up until just prior to the Message-ID of the second portion of the Group-ID include Message-ID 2222222222222222222222@example.com. Email client 122 determines that the second email conversation, or the new email conversation, comprises the email corresponding to the Message-ID that forms part of the second item of the Group-ID, i.e., Message-ID 3333333333333333333333@example.com, and emails corresponding to any Message-IDs listed thereafter in the References field of the first email conversation. In the example scenario, depicted herein, there are no Message-IDs listed after Message-ID 3333333333333333333333@example.com in the References field. However, if such Message-IDs existed, the corresponding emails would be listed in the new conversation.

Figure 11C:
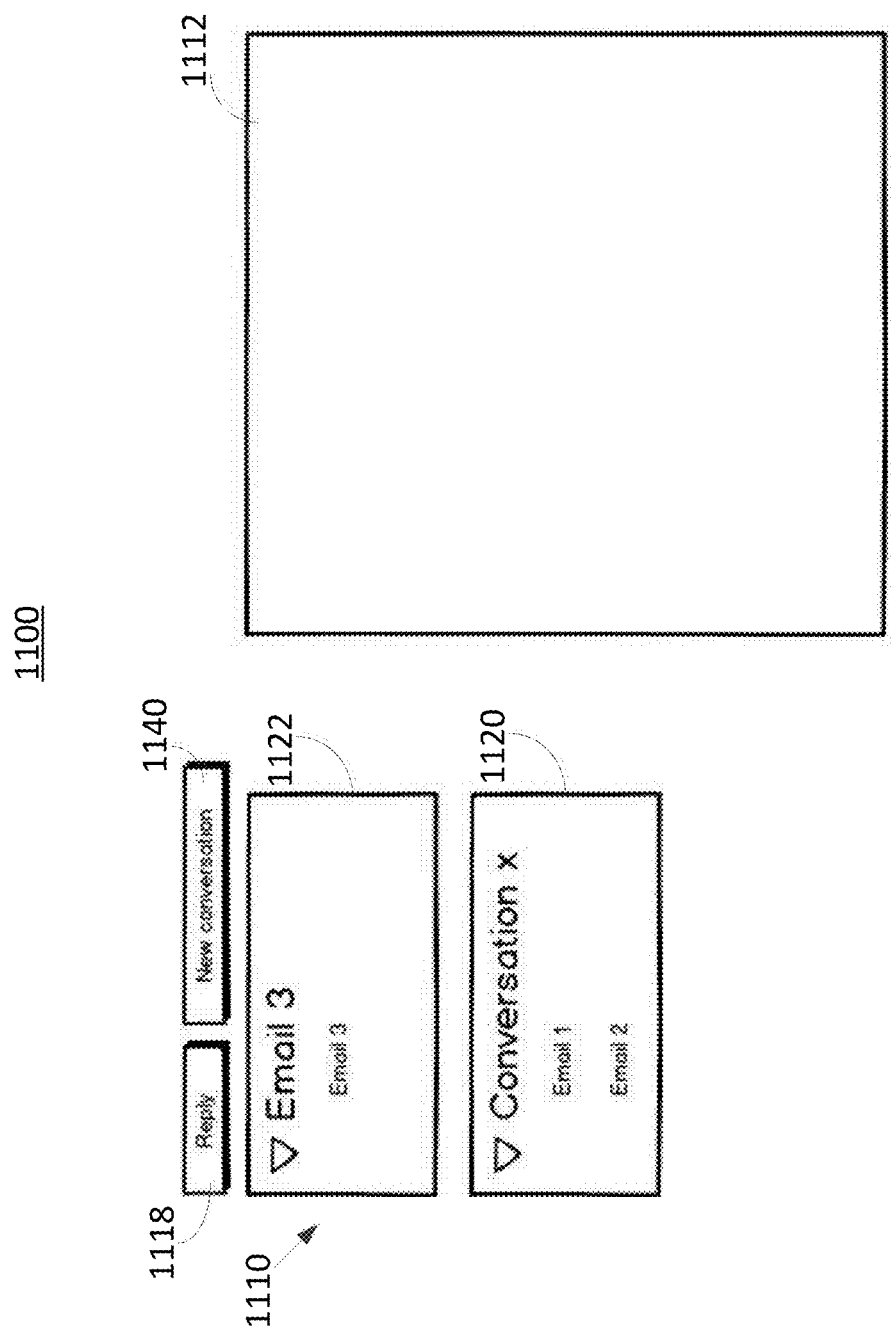

Having resolved the intended contents of the email conversations, email client 122 generates and displays a user interface displaying the existing conversation and the new conversation created from an email of the existing conversation. FIG. 11*c* depicts example user interface 1100 which has been refreshed to reflect the user request to create a new conversation from the selected email of the existing conversation. As shown, email listing pane 1110 includes existing email Conversation x 1120 comprising Email 1 and Email 2, and also includes new email conversation 1122 which comprises Email 3. Accordingly, email client 122 is adapted to create a new email conversation from an email in existing email conversation.

When a user selects an email in either of conversations 1220 or 122, the text of the email may be displayed in preview panel 1112. Referring to FIG. 10, at block 1022, email client 122 receives input indicating a user has selected an email in either of conversations 1120 or 1122. At block 1024, email client 122 determines from email header information that the selected email is comprised in a conversation that is related to another. In particular, email client 122 may determine that the email conversation has a group identifier, i.e., Group-ID, associated therewith. Email client 122 determines from the Message-IDs in the Group-ID the particular conversation linked to the selected email.

Figure 11D:
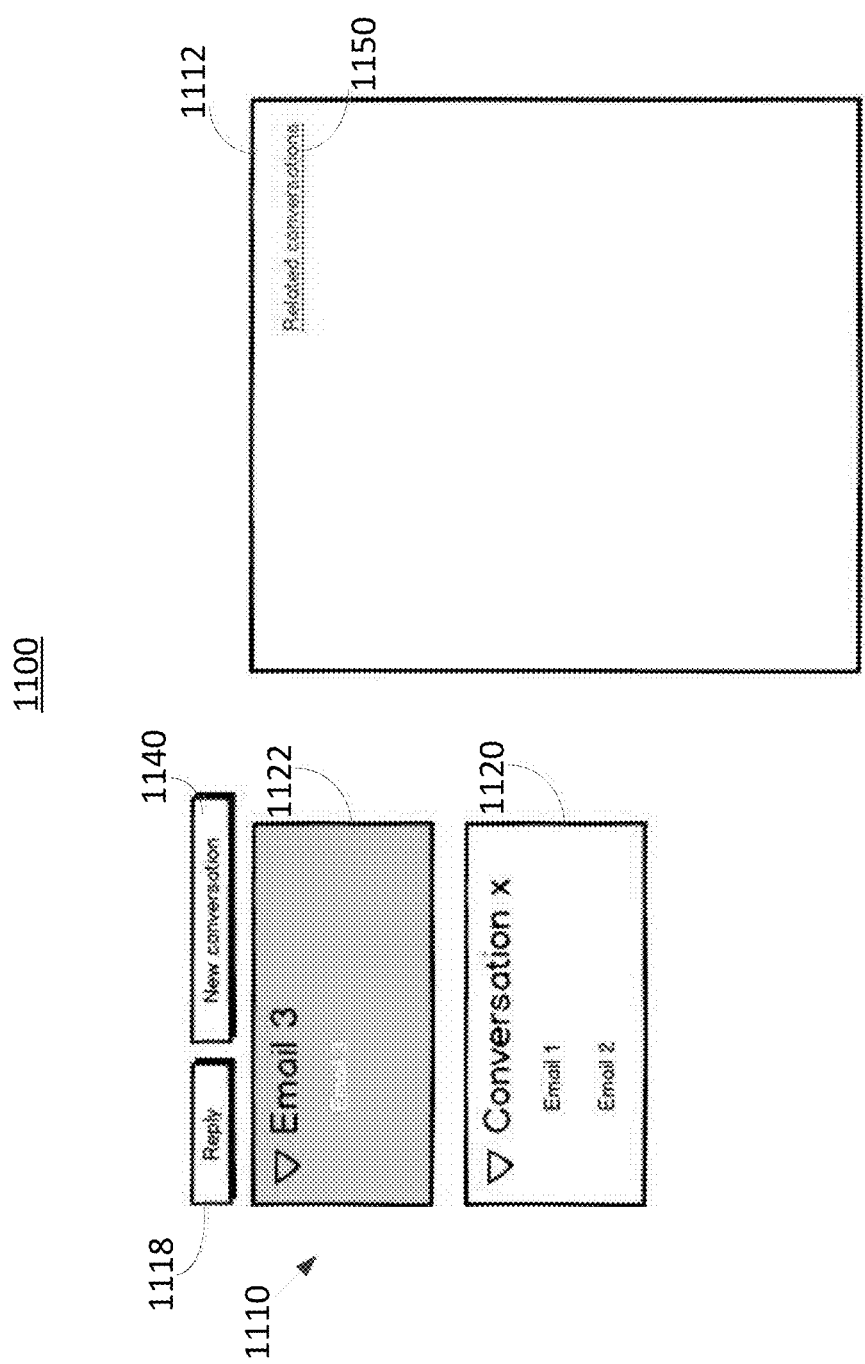
Figure 11E:
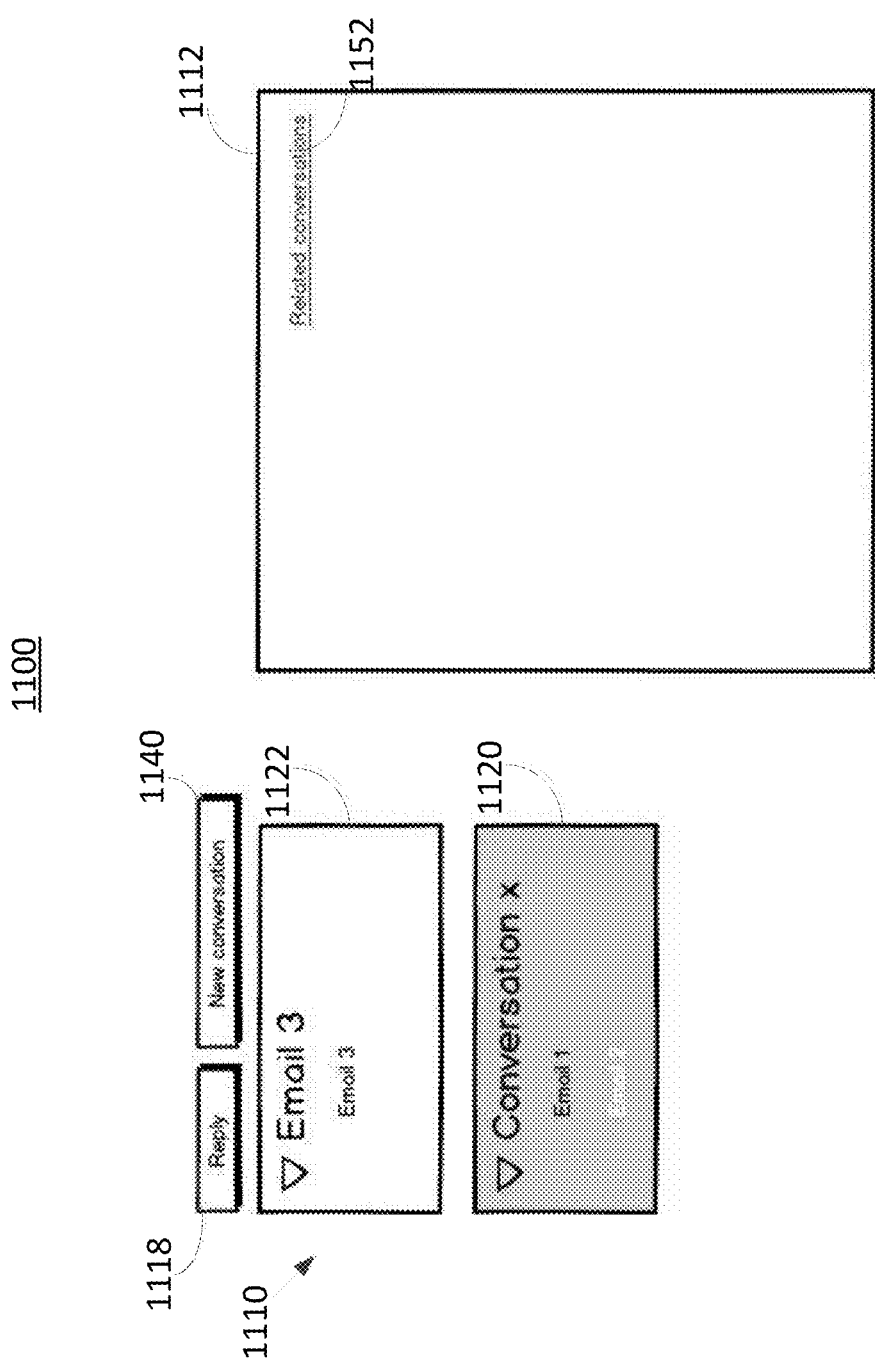

At block 1026, email client 122 generates a user interface feature providing notice that a relationship exists to another conversation. FIGS. 11*d* and 11*e* depict example user interfaces that may be generated by email client 122. As shown, in FIG. 11*d*, when Email 3 is selected, selectable link 1150 is displayed indicating a related conversation exists. Similarly, in FIG. 11*e*, when Email 2 in Conversation x 1120 is selected, selectable link 1152 is displayed indicating a related conversation exists. If the user selects either link 1150 or 1152, email client 122 generates a user interface feature such as, for example, a pop up with information regarding the related conversation.

It will be appreciated that when any of the emails in the above conversations replied to, the email and its header information is transmitted to the recipients. Accordingly, the Group-ID and References header data accompanies the emails. Similar to the embodiment described above in connection with FIG. 6, the email client at the recipient may perform similar analysis of the header information to identify that another user has created two conversations from the one. The recipient's email client may provide an indication to the recipient of the prior creation of a new conversation and provide a user interface feature with which the user may also implement the creation of a new conversation.

Starting New Email Conversation from an Existing Email Conversations

According to another aspect of the disclosed embodiments, a new email conversation may be started and an association drawn to an existing email conversation. In existing systems, an email will become associated with another email when the email is a reply to a previous email. Users cannot proactively create an email conversation and associate the new email conversation with an existing email conversation. For example, in a scenario where an email user may be involved in an email conversation, the user may wish to start a new email conversation that is different from the current conversation, i.e., is new, but which draws upon the current conversation.

In the systems and methods disclosed herein, a new email conversation may be created and associated with a selected existing conversation. The associations created between email conversations allow users to maintain context for the new conversation. In the earlier discussion regarding linking of email conversations, linking results in email conversations being grouped together for purposes of displaying the linked email conversations. As described below in connection with FIGS. 12 and 13, the disclosed system also supports simply maintaining an association between email conversations, although not for purposes of viewing the email conversations grouped together.

Figure 12:
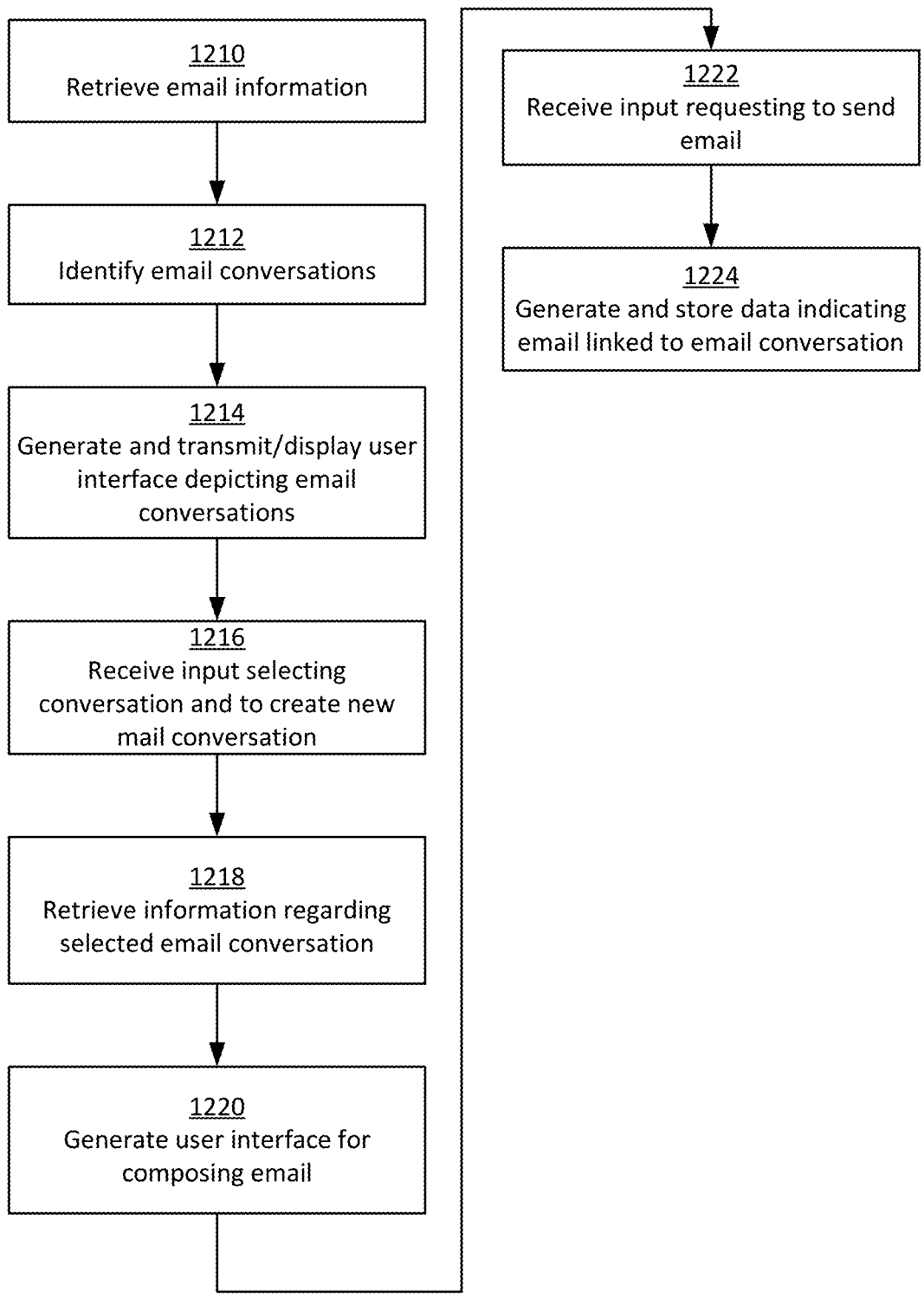
FIG. 12 depicts a flow diagram of an example process for starting a new email conversation from an existing email conversation.

FIG. 12 depicts a flow diagram of a process for creating a new email conversation by leveraging information associated with an existing email conversation. At block 1210, an email client 122 (FIG. 1) executing on any of client devices 120*a-c* retrieves email information, including email header information, from email service 130. In an example scenario, the retrieved information may comprise email header information including group identifiers, i.e., Group-ID's, created when an email user linked an email conversation to another. In an example scenario, email client 122 communicates via network 150 with MAPI 136 to request emails received for a particular email account or email user. MAPI 136 retrieves the corresponding email data including email headers from data storage 132 and communicates the data via network 150 to email client 122.

At block 1212, email client 122 processes the received email data to identify messages that are grouped together in email conversations. In an example scenario, email client 122 parses email header information to identify emails that form conversations. More particularly, email client 122 processes the References field information in the received email information to identify emails that form part of email conversations. The processing may include identifying in a References field an original or first message in a conversation and all subsequent replies flowing from the original message. In an example scenario, email client 122 may parse the References fields to identify the Message-ID's for all emails listed as belonging to an email conversation and retrieving the corresponding email data for the identified Message-ID's.

At block 1214, email client 122 generates and displays a user interface listing emails in the user's inbox. Where email client 122 has identified groups of related emails or email conversations, the user interface data depicts the groups of emails so as to identify that the emails are related or form a conversation. In an example scenario, email client 122 may generate data wherein emails comprised in email conversations are depicted adjacent to each other in a listing of emails. The emails may be indented to simulate the order of receipt of the emails.

Figure 13A:
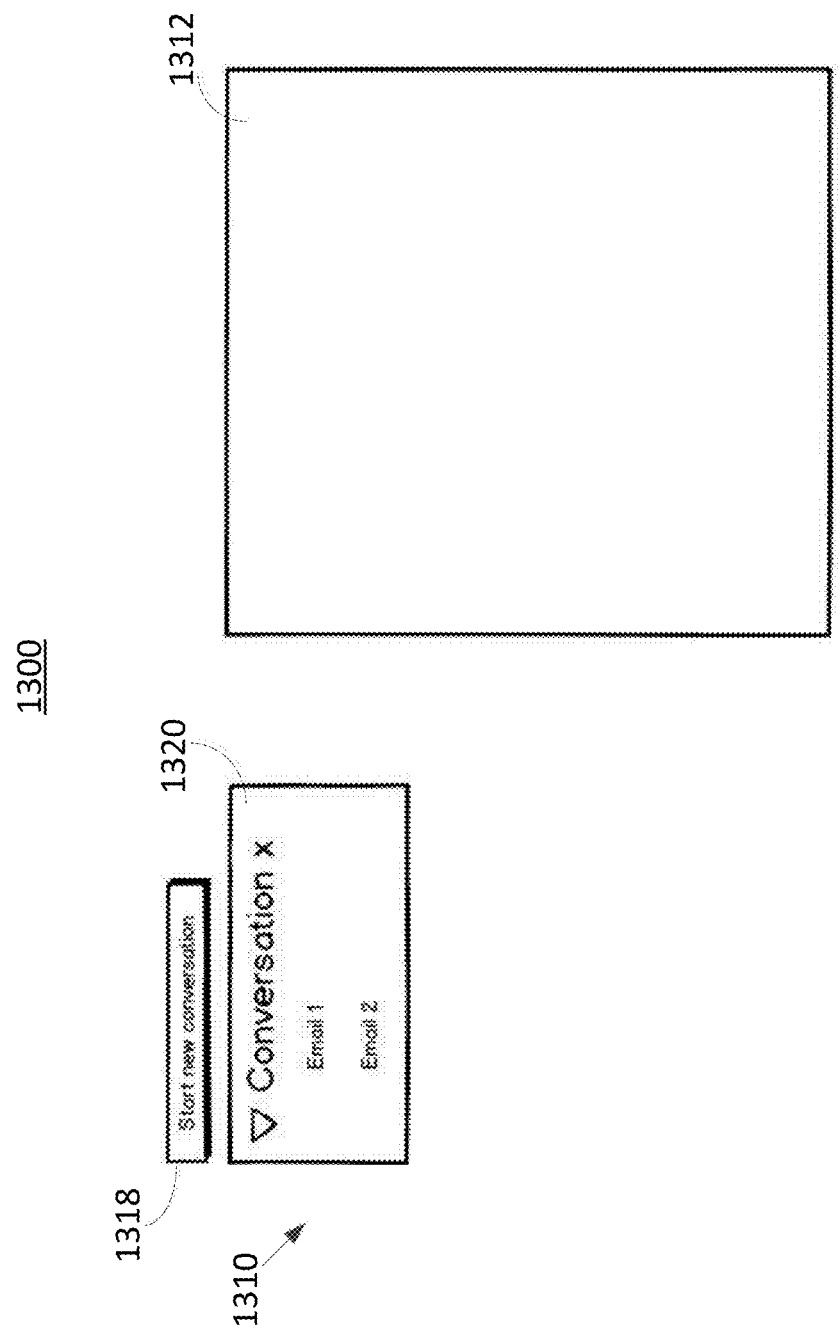
FIGS. 13a-d depict example graphical user interfaces for use in starting a new email conversation from an existing email conversation.

FIG. 13*a* depicts an example user interface 1300 that may be generated by email client 122 at block 614. As shown, in an example embodiment, the user interface data generated and displayed by email client 122 comprises email listing pane 1310 and email preview pane 1312. Email listing pane 1310 displays a listing of emails that email client 122 identified in the email data retrieved from service 130. As shown, email client 122 displays emails that are related to each other, i.e., are comprised in the same email conversation, in groups 1320. The emails comprised in an email conversation or group are displayed in proximity to each other. In an example scenario, the email conversations may be designated and differentiated from other emails by additional user interface features such as separate window panes, icons, headings, and indenting. Although not illustrated in FIG. 13*a*, email client 122 may provide a visual indication that email conversations have been linked by the user. For example, email client 122 may display linked email conversations in proximity to each other and may provide additional user interface features such as a common window pane to distinguish or identify linked email conversations.

Figure 13B:
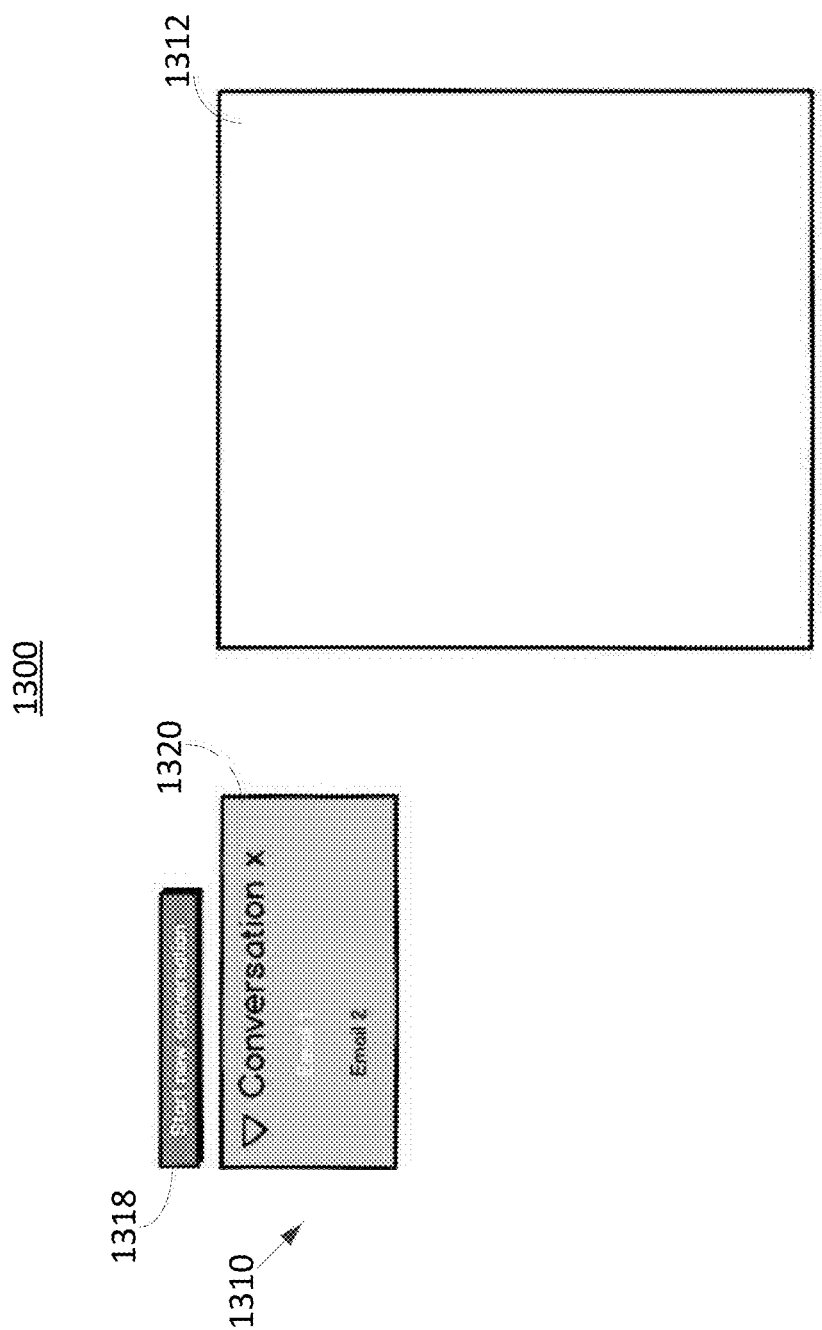

The generated user interface may be adapted to allow users to start a new email conversation and to create an association or relationship between the new conversation and an existing email conversation. In the example embodiment of FIG. 13*a*, email user interface 1300 comprises user interface feature 1318. User interface feature 1318 may be a button which when selected generates input requesting to create a new email conversation. As depicted in FIG. 3*b*, email conversation 1320 may be selected prior to selecting button 1318. When, as depicted in FIG. 13*b*, email conversation 1320 is selected and new email conversation button 1318 is also selected, input is generated requesting to create a new email conversation that is associated or has a relationship to the selected email conversation 1320.

At block 1216, email client 122 receives the inputs from the generated user interface selecting an email conversation and selecting to start a new email conversation. In response, at block 1218, email client 122 retrieves information from email headers regarding the selected email conversation. In particular, information that email client 122 may later make available to the user preparing a new email for the new email conversation may be retrieved. For example, email client 122 may retrieve information regarding the recipients of the emails in the particular email conversation. Similarly, email client 122 may retrieve information regarding the attachments to the emails in the particular email conversation.

Figure 13C:
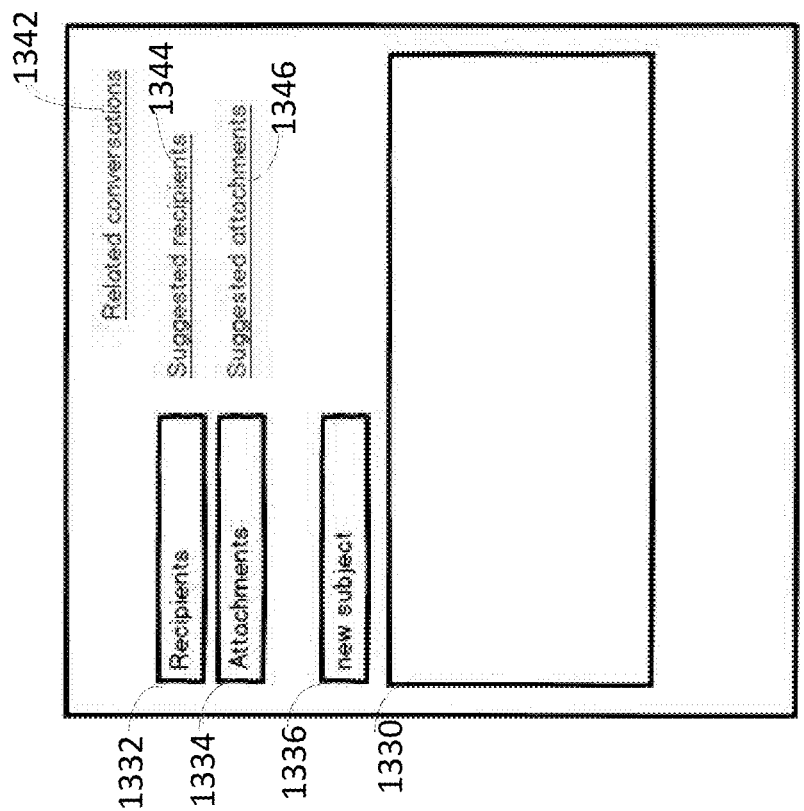

At block 1220, email client 122 generates and displays a user interface for use in composing an email. FIG. 13c depicts an example user interface. As shown, the user may enter the text of the email into area 1330. The subject of the text may be entered into text box 1336. Intended recipients are received into area 1332 and attachments may be specified in area 1334.

In view of the email having been identified as being associated with existing email conversation 1320, email client 122 provides mechanisms to access the information retrieved at step 1218 from the mail header information for the various emails in email conversation 1320. In an example embodiment, the user interface may comprise user interface features such as a link with which to access suggested recipients 1344 and to access suggested attachments 1346. If the user selects to access suggested recipients link 1344, email client 122 presents the recipients that email client 122 retrieved at step 1218 from the email header information for email conversation 1320. Similarly, if the user selects to access suggested attachments link 1346, email client 122 presents the attachments that were retrieved from the email header information for the emails in the first email conversation. In the example embodiment depicted in FIG. 13c, the user interface also comprises a related conversations link 1342 which when selected causes email client 122 to provide information regarding the email conversation to which the email will be linked. For example, email client 122 may have retrieved at step 1218 information regarding the number of emails in the email conversation, the topic of the email conversation, or any other information regarding the linked conversation which a user may find useful.

At block 1222, the user requests to send the email.

At block 1224, email client 122 generates and stores data representing or indicating an association or relationship between the new email conversation and the selected email conversation. In an example embodiment, email client 122 generates an identifier corresponding to the association between the generated email of the new email conversation and the selected email conversation. The identifier is stored in relation to the first email conversation and the generated email of the new email conversation. The identifier may have any form suitable for identifying that an email conversation or group of emails is linked to another email conversation. In an example embodiment, the generated identifier is derived from or comprises email header information identifying the generated email of the new email conversation and the selected email conversation. More particularly, the email header information may comprise a Message-ID created for the new email of the new email conversation and a Message-ID from the References field of the existing email conversation. In an example embodiment, the Message-ID of the original or first email in the existing email conversation is used and the Message-ID of the new email in the new email conversation is used.

The generated identifier may be referred to as a Group-Reference-ID. The Group-Reference-ID is a different identifier than the Group-ID that is described above in connection with, for example, FIGS. 2 and 4. The Group-ID as described above is understood by email clients 122 to signify that an email conversation has been linked and that the linked email conversations and/or emails should be grouped together for purposes of display in an email inbox. The Group-Reference-ID is used in the situation where it is desired to note that an email conversation has a relationship with another email conversation, but is not interpreted by the email client 122 as requiring that the email conversations be grouped together when displayed in a user's inbox. In other words, the Group-Reference-ID may be employed when an email conversation is related, but not for purposes of grouping emails in an email inbox.

The generated Group-Reference-ID may be stored in relation to the new email conversation and the existing email conversation. In an example embodiment, email client 122 may store the generated Group-Reference-ID in the header information of the new email comprised in the new email conversation and in the header information for each of the emails that are associated with selected existing email conversation. Email client 122 may store the information wherever the email header information resides including on the client device 120 and/or on service 130. It will be appreciated that the group identifier information stored in the header travels with the email. Accordingly, when the email including its header information is received at another user's inbox, the group identifier will be available for processing by the email client of the recipient.

Similar to the Group-ID that is described above in connection with FIG. 2, email client 122 may store the generated Group-Reference-ID external to the email header information. For example, email client 122 may store the generated Group-Reference-ID in a database along with information identifying that the Group-Reference-ID corresponds to the new email in the new email conversation and each of the emails that are comprised in the selected existing email conversation. Email client 122 may store the Group-Reference-ID wherever the email header information resides, including on the client device 120 and/or on service 130.

The generated Group-Reference-ID will also be stored in a list, which may be referred to as a reference list, which comprises Group-Reference-IDs that the particular user/owner/operator has herself implemented. For example, the generated Group-Reference-ID may be stored with Group-Reference-IDs for other associations that this particular user has implemented. Email client 122 may subsequently use the information in the reference list to distinguish associated email conversations that the particular user/owner/owner has herself created from those that other users have created. The reference list of Group-Reference-IDs corresponding to email conversation associations the user herself has created may be stored in any manner and in any location suitable to be operable. In an example embodiment, the reference list may be stored in a database that is maintained locally on client device 120 and/or on storage 132 in email service 130.

Figure 13D:
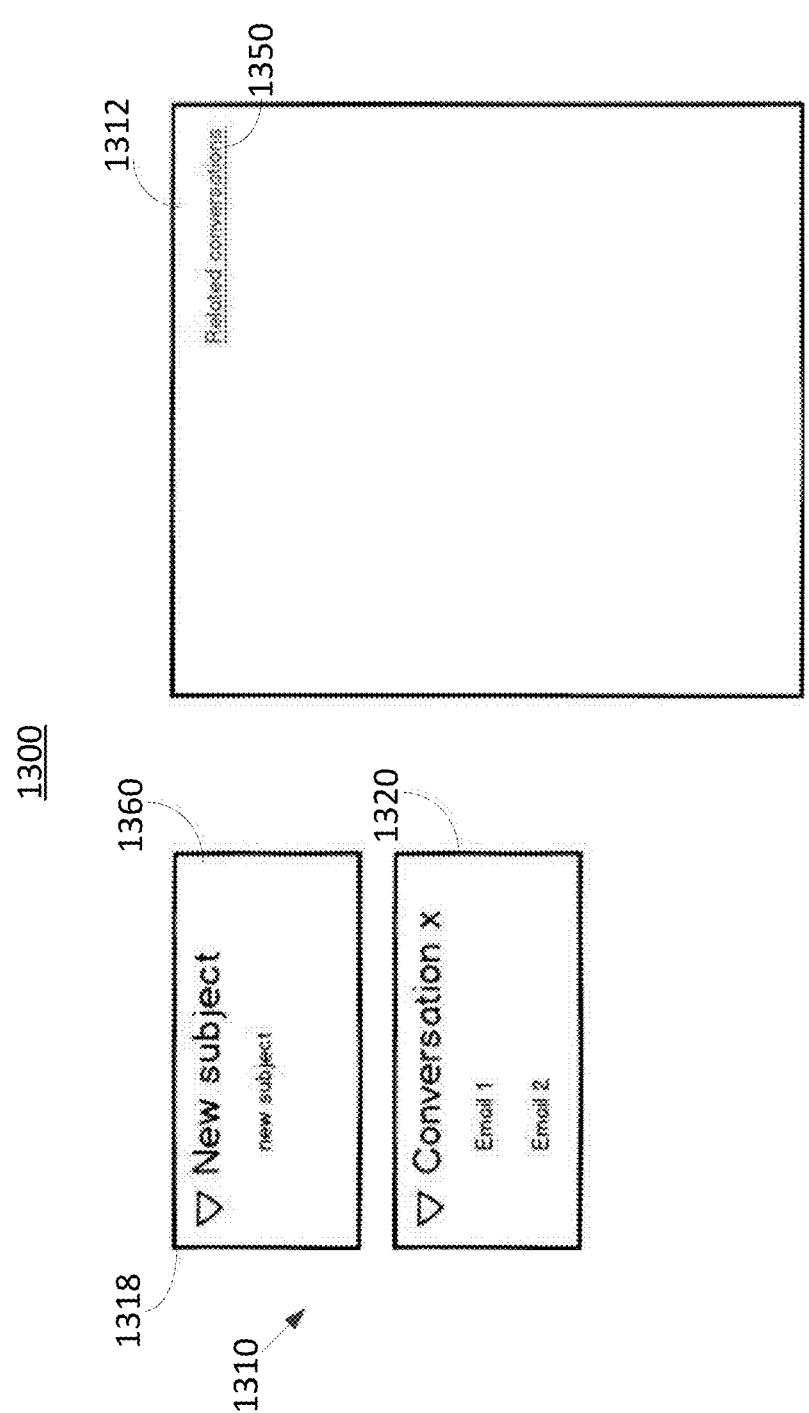

FIG. 13d depicts a user interface generated by email client 122 of a recipient of the newly generated email in the new email conversation. As shown, the newly generated email, titled "new subject," and the new email conversation 1360 are shown in the email listing 1310 at the recipient's email client. Previously existing email conversation 1320 is also shown. When the new email in the new conversation 1360 is selected in the email listing 1310, the body of the email is previewed in preview pane 1312. Email client 122 notifies the recipient that the email was previously associated with an email conversation by displaying related conversation link 1350. Further, and consistent with the description above in connection with FIG. 6, the user may implement or create the association herself Once the particular user implements the association, the recipient's email client 122 will thereafter recognize the email and email conversation 1360 are associated with the selected email conversation 1320.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 14:
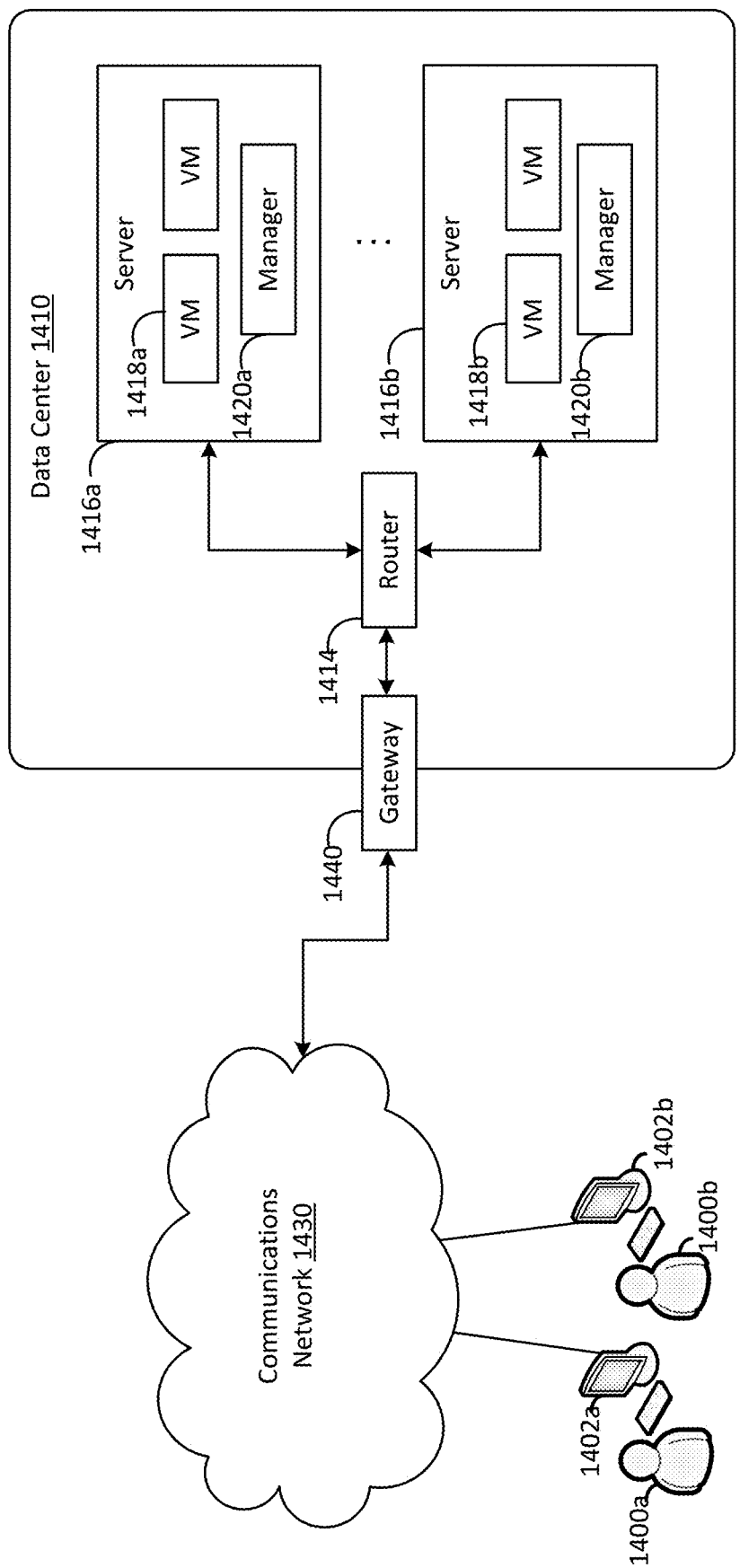
FIG. 14 depicts an example computing system that may be used in some embodiments.

FIG. 14 illustrates an example computing environment in which the embodiments described herein may be implemented. FIG. 14 is a diagram schematically illustrating an example of a data center 1410 that can provide computing resources to users 1400a and 1400b (which may be referred herein singularly as "a user 1400" or in the plural as "the users 1400") via user computers 1402a and 1402b (which may be referred herein singularly as "a computer 1402" or in the plural as "the computers 1402") via a communications network 1430. Data center 1410 may be configured to provide computing resources for executing applications on a permanent or an as-needed basis. The computing resources provided by data center 1410 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including email servers, web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 1410 may include servers 1416a and 1416b (which may be referred herein singularly as "a server 1416" or in the plural as "the servers 1416") that provide computing resources available as virtual machine instances 1418a and 1418b (which may be referred herein singularly as "a virtual machine instance 1418" or in the plural as "the virtual machine instances 1418"). The virtual machine instances 1418 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 14, communications network 1430 may, for example, be a publicly accessible network of linked networks and possibly operated by various distinct parties, such as the Internet. In other embodiments, communications network 1430 may be a private network, such as, for example, a corporate or university network that is wholly or partially inaccessible to non-privileged users. In still other embodiments, communications network 1430 may include one or more private networks with access to and/or from the Internet.

Communications network 1430 may provide access to computers 1402. Computers 1402 may be computers utilized by customers 1400 or other customers of data center 1410. For instance, user computer 1402a or 1402b may be a server, a desktop or laptop personal computer, a tablet computer, a wireless telephone, a personal digital assistant (PDA), an e-book reader, a game console, a set-top box, or any other computing device capable of accessing data center 1410. User computer 1402a or 1402b may connect directly to the Internet (e.g., via a cable modem or a Digital Subscriber Line (DSL)). Although only two user computers 1402a and 1402b are depicted, it should be appreciated that there may be multiple user computers.

Computers 1402 may also be utilized to configure aspects of the computing resources provided by data center 1410. In this regard, data center 810 might provide a Web interface through which aspects of its operation may be configured through the use of a Web browser application program executing on user computer 1402. Alternatively, a stand-alone application program executing on user computer 1402 might access an application programming interface (API) exposed by data center 1410 for performing the configuration operations. Other mechanisms for configuring the operation of the data center 1410, including deploying updates to an application, might also be utilized.

Servers 1416a and 1416b (which may be referred herein singularly as "a server 1416" or in the plural as "the servers 1416") shown in FIG. 14 may be standard servers configured appropriately for providing the computing resources described above and may provide computing resources for executing one or more applications. In one embodiment, the computing resources may be virtual machine instances 1418. In the example of virtual machine instances, each of the servers 1416 may be configured to execute an instance manager 1420a or 1420b (which may be referred herein singularly as "an instance manager 1420" or in the plural as "the instance managers 1420") capable of executing the virtual machine instances. The instance managers 1420 may be a virtual machine monitor (VMM) or another type of program configured to enable the execution of virtual machine instances 1418 on servers 1416, for example. As discussed above, each of the virtual machine instances 1418 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 1410 shown in FIG. 14, a router 1414 may be utilized to interconnect the servers 1416a and 1416b. Router 1414 may also be connected to gateway 1440, which is connected to communications network 1430. Router 1414 may manage communications within networks in data center 1410, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that data center 1410 described in FIG. 14 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 1410 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 1410 can be scaled on-demand.

Auto scaling is one mechanism for scaling computing resources in response to increases or lulls in demand for the resources. Auto scaling allows customers of data center 1410 to configure data center 1410 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 1410.

Data center 1410 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 15:
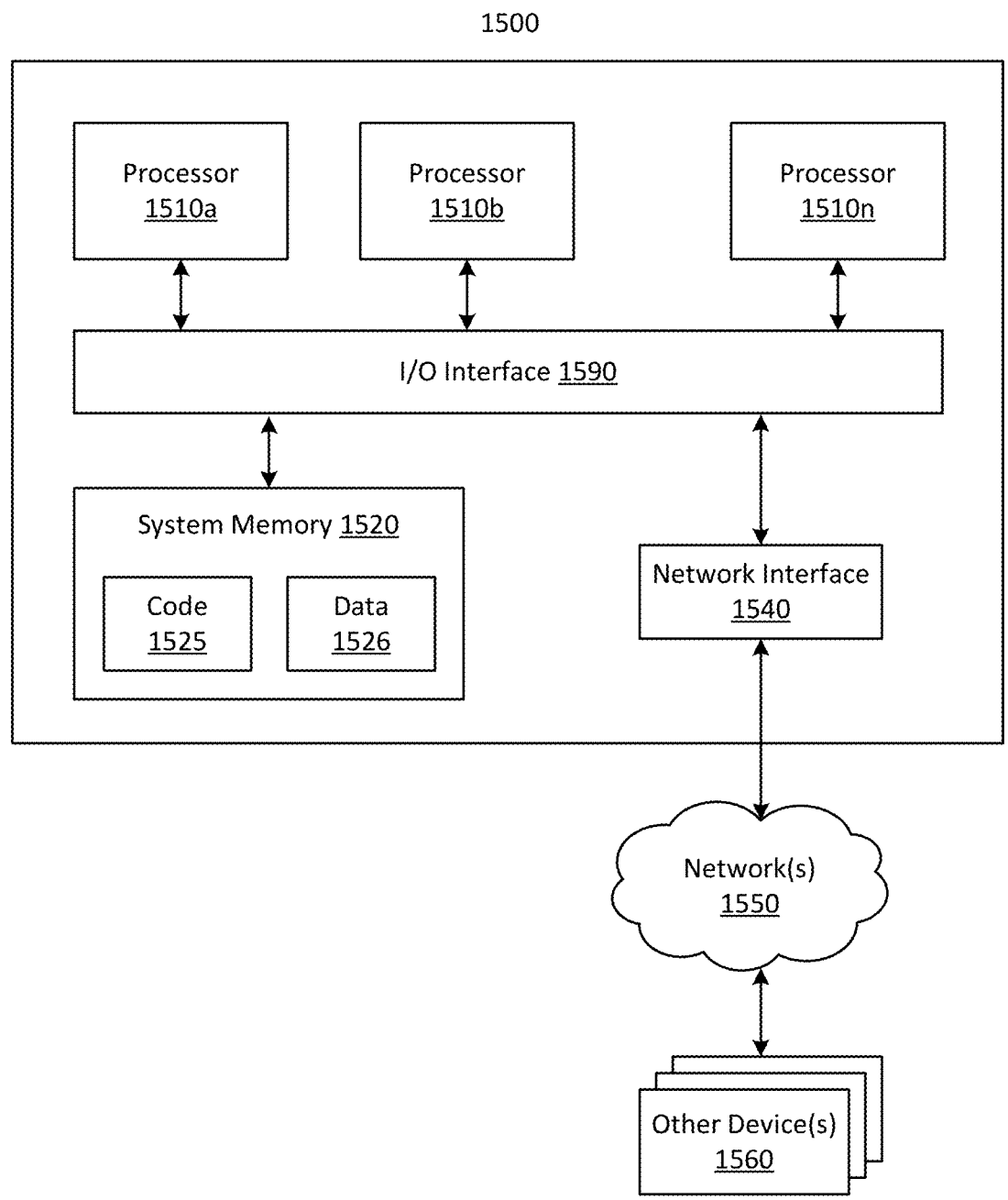
FIG. 15 depicts an example computing system that may be used in some embodiments.

In at least some embodiments, a server or other computing device that implements a portion or all of one or more of the technologies described herein, including the techniques to implement the functionality described herein in reference to client devices 120*a-c* and email service 130 may include a general purpose computer system that includes or is configured to access one or more computer-accessible media. FIG. 15 illustrates such a general purpose computing device 1500. In the illustrated embodiment, computing device 1500 includes one or more processors 1510*a*, 1510*b*, and/or 1510*n* (which may be referred herein singularly as "a processor 1510" or in the plural as "the processors 1510") coupled to a system memory 1520 via an input/output (I/O) interface 1590. Computing device 1500 further includes a network interface 1540 coupled to I/O interface 1590.

In various embodiments, computing device 1500 may be a uniprocessor system including one processor 1510 or a multiprocessor system including several processors 1510 (e.g., two, four, eight, or another suitable number). Processors 1510 may be any suitable processors capable of executing instructions. For example, in various embodiments, processors 1510 may be general purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code 1525 and data 1526.

In one embodiment, I/O interface 1590 may be configured to coordinate I/O traffic between processor 1510, system memory 1520, and any peripheral devices in the device, including network interface 1540 or other peripheral interfaces. In some embodiments, I/O interface 1590 may perform any necessary protocol, timing, or other data transformations to convert data signals from one component (e.g., system memory 1520) into a format suitable for use by another component (e.g., processor 1510). In some embodiments, I/O interface 1590 may include support for devices attached through various types of peripheral buses, such as a variant of the Peripheral Component Interconnect (PCI) bus standard or the Universal Serial Bus (USB) standard, for example. In some embodiments, the function of I/O interface 1590 may be split into two or more separate components, such as a north bridge and a south bridge, for example. Also, in some embodiments some or all of the functionality of I/O interface 1590, such as an interface to system memory 1520, may be incorporated directly into processor 1510.

Network interface 1540 may be configured to allow data to be exchanged between computing device 1500 and other device or devices 1560 attached to a network or network(s) 1550, such as other computer systems or devices as illustrated in FIGS. 1 through 15, for example. In various embodiments, network interface 1540 may support communication via any suitable wired or wireless general data networks, such as types of Ethernet networks, for example. Additionally, network interface 1540 may support communication via telecommunications/telephony networks, such as analog voice networks or digital fiber communications networks, via storage area networks, such as Fibre Channel SANs or via any other suitable type of network and/or protocol.

In some embodiments, system memory 1520 may be one embodiment of a computer-accessible medium configured to store program instructions and data as described above in connection with FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1500 via I/O interface 1590. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1500 as system memory 1520 or another type of memory. Further, a computer-accessible medium may include transmission media or signals such as electrical, electromagnetic or digital signals, conveyed via a communication medium such as a network and/or a wireless link, such as may be implemented via network interface 1540. Portions or all of multiple computing devices, such as those illustrated in FIG. 15, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Accordingly, applicant has disclosed systems, methods, and computer readable media that are adapted for linking emails and email conversations. According to a first aspect of the disclosed embodiments, email conversations may be linked to each other. A user interface is adapted to receive user inputs selecting first and second email conversations and specifying that the two should be linked. In response to receiving these inputs, the email client generates an identifier and associates the identifier with emails that are comprised in the selected first and second email conversations. The email client subsequently uses the generated identifier and the associations with emails to identify linked email conversations and to display the linked conversations in proximity to each other in a listing of emails.

According to another aspect of the disclosed embodiments, a first email conversation that has been linked to a second email conversation by a first user may be subsequently linked by a recipient of an email in the first email conversation. When an email that is part of an email conversation that was previously linked by another user but not by the recipient is selected for review, the email client identifies the prior linking in the user interface and provides a selectable button with which the recipient may request that the email conversations be linked for purposes of the recipient's inbox as well. In response to receiving input indicating the email user has selected to implement linking the email conversations, the email client stores the group identifier that was retrieved from the email header information in the particular email recipient's list of identifiers corresponding to links that have been implemented by the particular user.

According to another aspect of the disclosed embodiments, a new email, one that is not sent in reply to a received email, may be linked to an existing email conversation. The user interface is adapted to receive user inputs selecting an email conversation and selecting to create an email that will be linked to the selected email conversation. The email client retrieves and makes available for use in creating the new email information from the email header information of emails in the first email conversation. When the user sends the email, the email client generates an identifier and associates the identifier with the new email and the selected email conversation. The email client subsequently uses the generated identifier and the associations with emails to identify linked email conversations and to display the linked conversations in proximity to each other in a listing of emails.

According to another aspect of the disclosed embodiments, an email conversation may be created from an email in an existing email conversation. The user interface is adapted to receive user inputs selecting an email in a listed email conversation and selecting to start a new conversation using the selected email. The email client generates a group identifier corresponding to a link between a new conversation comprising the selected email and the conversation in which the email was selected. The email client subsequently uses the generated identifier and the association with the selected email in the new conversation and the emails in the selected existing email conversation to generate and display information identifying a new conversation comprising the selected email and the selected existing email conversation.

According to another aspect of the disclosed embodiments, a new email conversation, one that is not created from an email in an existing email conversation, may be linked to an existing email conversation. The user interface is adapted to receive user inputs selecting one of the listed email conversations and selecting to create a new email conversation that will be linked to the selected email conversation. The email client retrieves and makes available to the author of the email information from the email header information of emails in the selected conversation. When the user requests to send the new email, the email client generates a group reference identifier corresponding to an association between the new email conversation and the selected email conversation. The email client subsequently uses the generated group reference identifier to identify related email conversations and to create and display information indicating emails in the conversations are associated with other conversations.

It will be appreciated that while illustrative embodiments have been disclosed, the scope of potential embodiments is not limited to those explicitly described. For example, while the concepts are described with reference to particular user interfaces, the envisioned embodiments extend to any user interfaces that may be suitable for performing the described linking functions. Likewise, while particular email technologies such as MAPI, POP, and SMTP are referred to, any such email technologies may be used and still fall within the scope of envisioned embodiments.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for creating a new email conversation, comprising:
    receiving one or more email messages sent to an email address according to an email messaging protocol;
    parsing email header information in the one or more email messages to identify a first email conversation comprising a first email message among the one or more email messages and reply email messages to the first email among the one or more email messages;
    presenting a user interface, the user interface displaying the first email conversation;
    receiving input specifying the first email conversation and specifying to create a new email conversation;
    generating an identifier associated with the new email conversation;
    generating an identifier corresponding to an association between the first email conversation and the new email conversation; and
    storing the identifier corresponding to the association between the first email conversation and the new email conversation in email header information for emails in the first email conversation and a new email in the new email conversation.

2. The computer-implemented method of claim 1, further comprising:
    retrieving, from email header information for the first email conversation, information identifying recipients of emails in the first email conversation; and
    presenting a user interface for preparing the new email in the new email conversation comprising a user interface feature for accessing information identifying recipients of emails in the first email conversation.

3. The computer-implemented method of claim 2, further comprising:
    retrieving information identifying attachments to emails in the first email conversation; and
    presenting, on the user interface for preparing the new email, a user interface feature for accessing information identifying attachments to emails in the first email conversation.

4. The computer-implemented method of claim 1, wherein generating an identifier corresponding to a link between the first email conversation and the new email conversation comprises:
    identifying from email header information a first message identifier of an email in the first email conversation; and forming an identifier comprising the identified first message identifier and the identifier for the new email conversation.

5. A computing system, comprising:
computing memory having stored therein computer instructions that, upon execution by one or more processors, at least cause the computing system to perform operations comprising:
receiving one or more email messages sent to an email address according to an email messaging protocol;
parsing email header information in the one or more email messages to identify an existing email conversation comprising a first email message among the one or more email messages and reply email messages to the first email among the one or more email messages;
receiving input indicating to associate a new email conversation with the existing email conversation;
generating data representing an association between the new email conversation and the existing email conversation; and
storing the identifier corresponding to the association between the first email conversation and the new email conversation in email header information for emails in the first email conversation and a new email in the new email conversation.

6. The computing system of claim 5, wherein receiving input indicating to associate a new email conversation with an existing email conversation comprises receiving input from a graphical user interface indicating to associate the new email conversation and the existing email conversation.

7. The computing system of claim 6, wherein receiving input from a graphical user interface indicating to associate the new email conversation and the existing email conversation comprises receiving input originating from the graphical user interface indicating that the existing email conversation has been selected and that a graphical button corresponding to starting a new email conversation has been depressed.

8. The computing system of claim 5, wherein generating data representing a link between the new email conversation and the existing email conversation comprises generating an identifier corresponding to the association between the new email conversation and the existing email conversation.

9. The computing system of claim 8, the operations further comprising:
storing the identifier in relation to one or more emails in the existing email conversation and in relation to at least one email in the new email conversation.

10. The computing system of claim 9, wherein storing the identifier in relation to one or more emails in the existing email conversation and in relation to the at least one email in the new email conversation comprises storing the identifier in email header information of one or more emails in the first email conversation and in email header information of the at least one email in the new email conversation.

11. The computing system of claim 9, wherein storing the identifier in relation to one or more emails in the existing email conversation and in relation to the at least one email in the new email conversation comprises storing the identifier in relation to each of one or more emails in the existing email conversation and in relation to the at least one email in the new email conversation.

12. The computing system of claim 11, wherein storing the identifier in relation to each of one or more emails in the first email conversation and in relation to the at least one email in the new email conversation comprises storing in a database the identifier and relationship to each of one or more emails in the first email conversation and in relation to the at least one email in the new email conversation.

13. The computing system of claim 10, the operations further comprising:
storing the identifier in a list of identifiers for a user, each identifier in the list of identifiers identifying an association with an email conversation implemented by the user.

14. The computing system of claim 5, wherein generating data representing a link between the existing email conversation and the existing email conversation comprises:
identifying from email header information a first message identifier of an email in the existing email conversation;
generating a unique identifier for the email; and
forming an identifier comprising the identified first message identifier and the unique identifier for the email.

15. The computing system of claim 14,
wherein identifying from email header information a first message identifier of an email in the first email conversation comprises identifying a Message-ID for an originating message in the first email conversation;
wherein generating the unique identifier for the email comprises generating a unique Message-ID for the email; and
wherein forming an identifier comprising the identified first message identifier and the unique identifier for the email comprises forming an identifier comprising the Message-ID for the originating message in the first email conversation and the unique Message-ID for the email.

16. The computing system of claim 5, the operations further comprising:
retrieving, from email header information for the existing email conversation, information identifying recipients of a first group of emails; and
presenting a user interface for preparing a new email, the user interface for preparing the new email comprising a user interface feature for accessing information identifying recipients of the first group of emails.

17. The computing system of claim 16, the operations further comprising:
the computing system retrieving, from email header information for the existing email conversation, information identifying attachments to the first group of emails; and
presenting, on the user interface for preparing the new email, a user interface feature for accessing information identifying attachments to the first group of emails.

18. A non-transitory computer-readable storage medium having stored thereon computer instructions that, upon execution by one or more processors, at least cause a computing system to perform operations comprising:
receiving one or more email messages sent to an email address according to an email messaging protocol;
parsing email header information in the one or more email messages to identify a first email conversation comprising a first email message among the one or more email messages and reply email messages to the first email among the one or more email messages;
generating a user interface listing emails received for a first user, the user interface displaying the identified first email conversation and comprising a user interface feature for selecting to start a new email conversation;
receiving, at the user interface, input selecting the first email conversation and selecting to start a new email conversation;
generating a user interface for composing an email, the user interface for composing the email comprising a user interface feature selectable to request information regarding the first email conversation; and storing the identifier corresponding to the association between the first email conversation and the new email conversation in email header information for emails in the first email conversation and a new email in the new email conversation.

19. The non-transitory computer-readable storage medium of claim 18, wherein the user interface for composing the email further comprises a user interface feature selectable to review recipients of emails in the first email conversation.

20. The non-transitory computer-readable storage medium of claim 19, wherein the user interface for composing the email further comprises a user interface feature selectable to review attachments to emails in the first email conversation.

\* \* \* \* \*